United States Patent [19]

Aizawa et al.

[11] Patent Number: 4,845,651
[45] Date of Patent: Jul. 4, 1989

[54] GEOMETRIC MODELLING SYSTEM

[75] Inventors: Tamio Aizawa; Kyoji Takahara, both of Ibaraki; Koichi Yamato, Tsuchiura, all of Japan

[73] Assignee: Hitachi, Ltd., Tokyo, Japan

[21] Appl. No.: 925,906

[22] Filed: Nov. 3, 1986

[30] Foreign Application Priority Data

Nov. 1, 1985 [JP] Japan .................................. 60-243960

[51] Int. Cl.$^4$ .............................................. G06F 15/62
[52] U.S. Cl. ..................................... 364/522; 364/521; 340/747; 382/44
[58] Field of Search ............... 364/521, 522, 518, 512, 364/340; 340/720, 732, 734, 747, 729; 382/56, 65, 44

[56] References Cited

U.S. PATENT DOCUMENTS

| 4,384,338 | 5/1983 | Bennett | 364/522 |
|---|---|---|---|
| 4,498,139 | 2/1985 | Malinousky | 364/518 |
| 4,674,046 | 6/1987 | Ozeki et al. | 364/144 |
| 4,685,070 | 8/1987 | Flinchbaugh | 364/522 |
| 4,734,690 | 3/1988 | Waller | 340/729 |
| 4,736,306 | 4/1988 | Christensen et al. | 364/513 |

OTHER PUBLICATIONS

Appel et al., "Program for the Interactive Design of Polyhedra", IBM Technical Disclosure Bulletin, vol. 14, No. 7, 12/71, pp. 2037–2045.
Automated Conversion of Data Representations—Ganter et al, Computer in Mech. Eng., 9/83.
The Cyclic Order Properties of Vertices—Freeman, Communications of ACM, 6/79.
Euler Formulas and Geometric Modeling—Wilson, IEEE CG & A, 8/85.
A CAD System's Framework—Takala, IEEE CG & A, 4/85.
On Automatic Recognition of 3D Structures from 2D Representation Computer Aided Design, 3/83.
An Automated Sculpted Surface CAD Procedure Based on High Level Computer Graphics and Expert Systems—Computers in Engineering, 8/1985.
An Interactive Geometric Modelling System Based on Practical Engineering Drawings—Computer in Engineering, 8/82.

Primary Examiner—Gary V. Harkcom
Assistant Examiner—Phu K. Nguyen
Attorney, Agent, or Firm—Antonelli, Terry & Wands

[57] ABSTRACT

A geometric modelling system having a display device which displays two-dimensional wire frame pattern representing surfaces which constitute a three-dimensional form as an object, and an operation unit which automatically forms, as the user appoint a point within the two-dimensional wire frame pattern, a definite surface or boundaries of the definite surface with high matching property, while confirming the completeness of various states such as double-definition of a constituent line, states of intersection, and so forth, so as to satisfy various geometric conditions.

18 Claims, 24 Drawing Sheets

FIG. 3
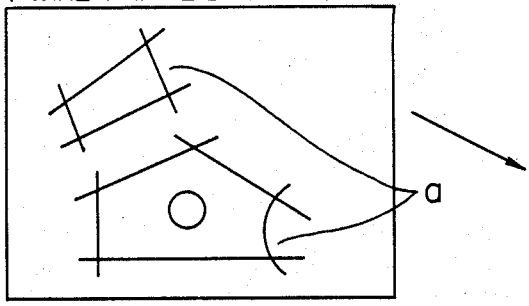
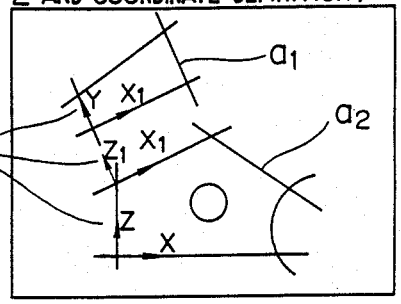
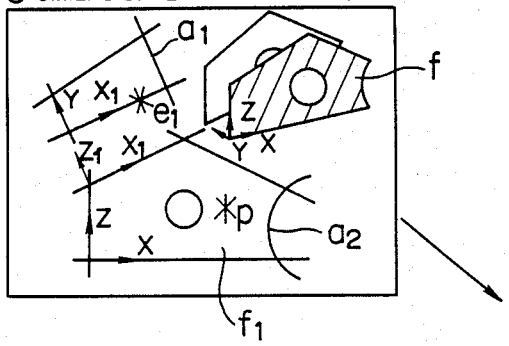
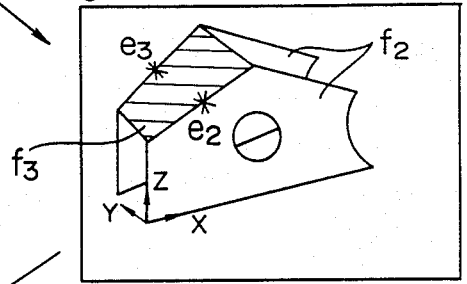
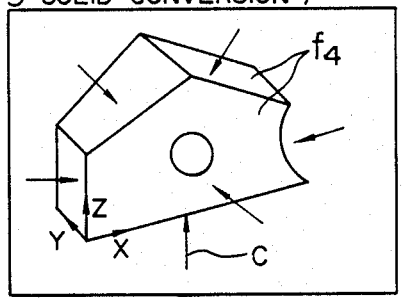

F I G. 6A
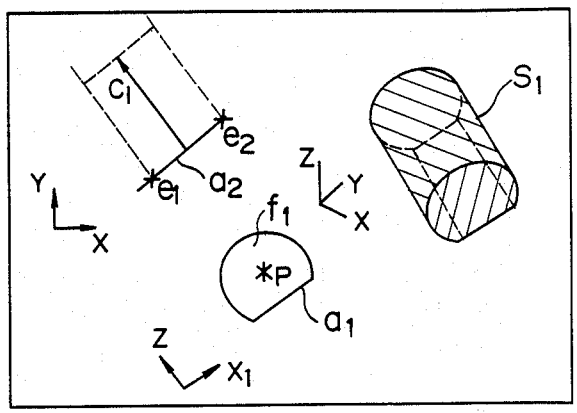
F I G. 6B
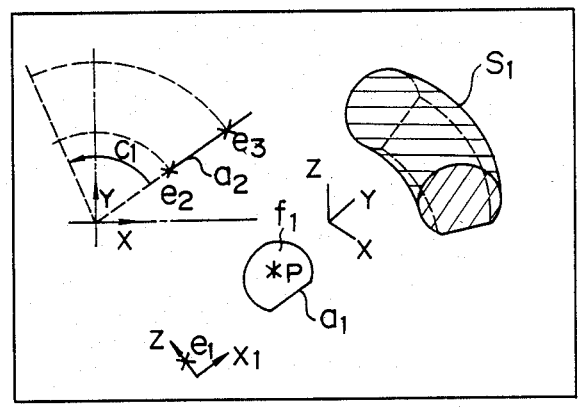

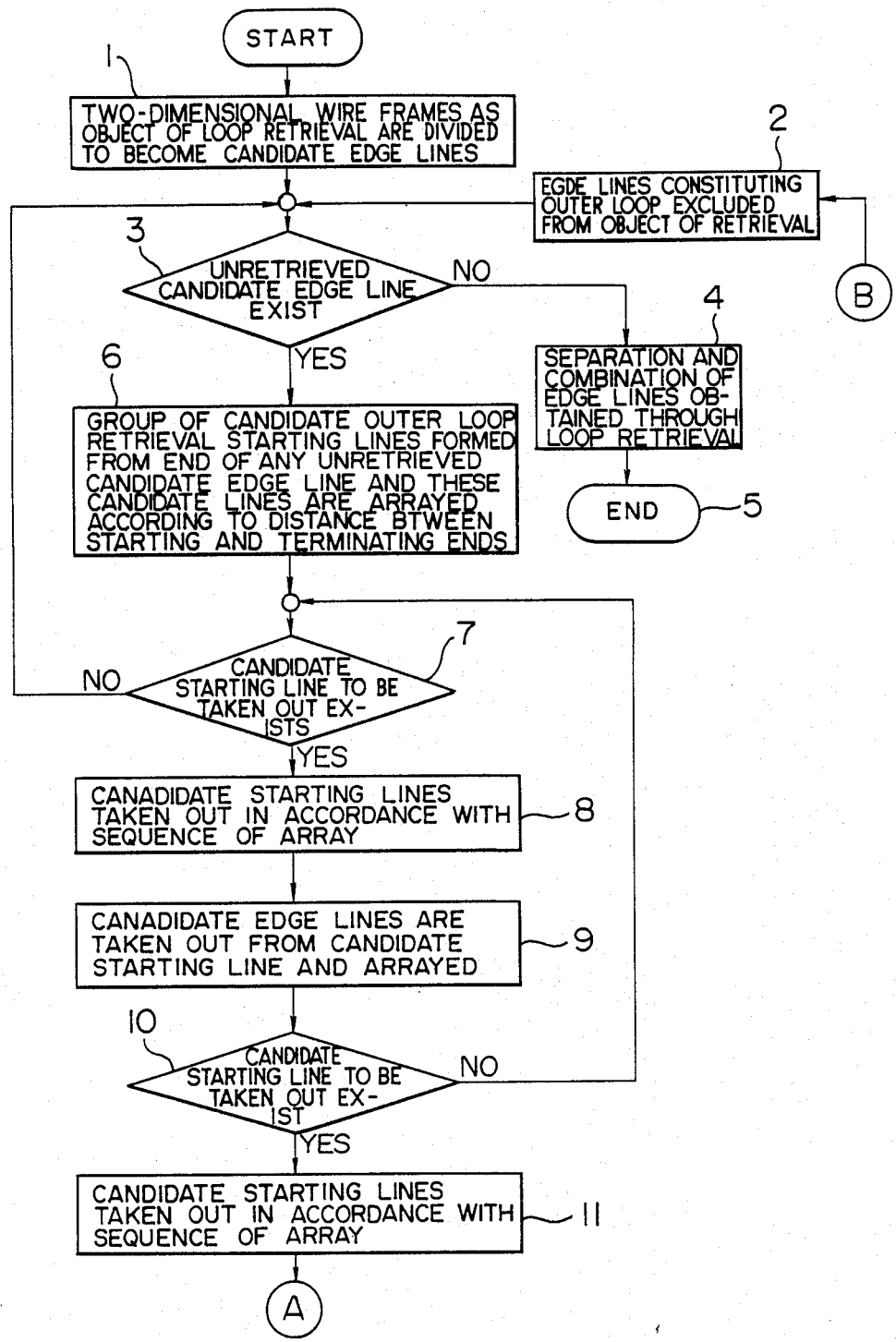

F I G. 19A
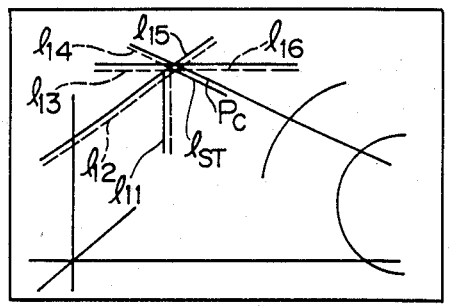
F I G. 19B
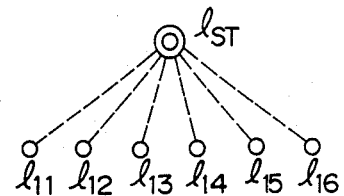
F I G. 20A
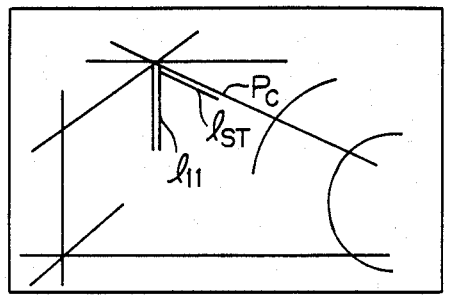
F I G. 20B
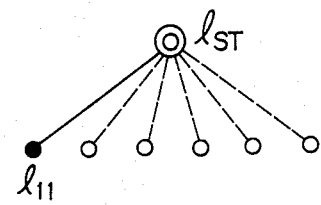
F I G. 21A
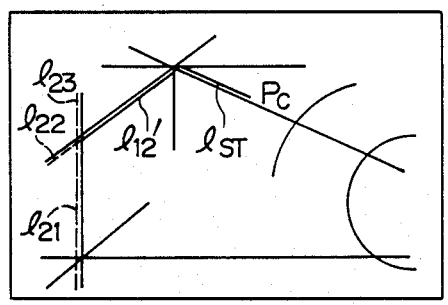
F I G. 21B
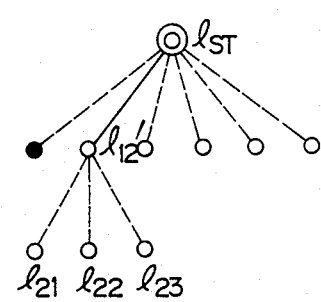

F I G. 31A 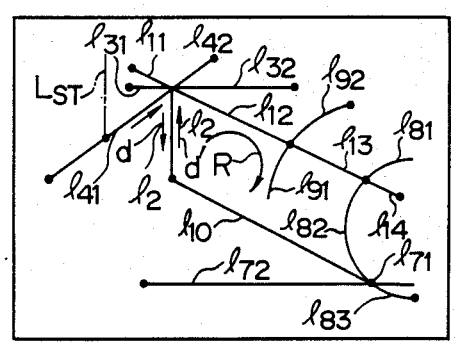
F I G. 31B 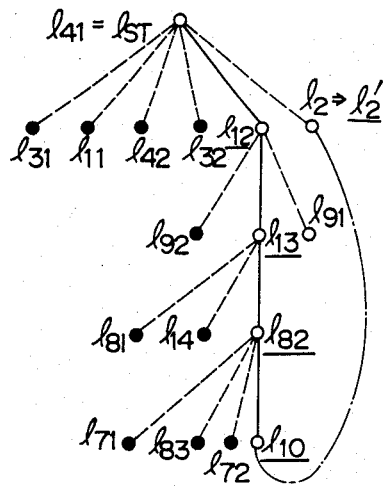

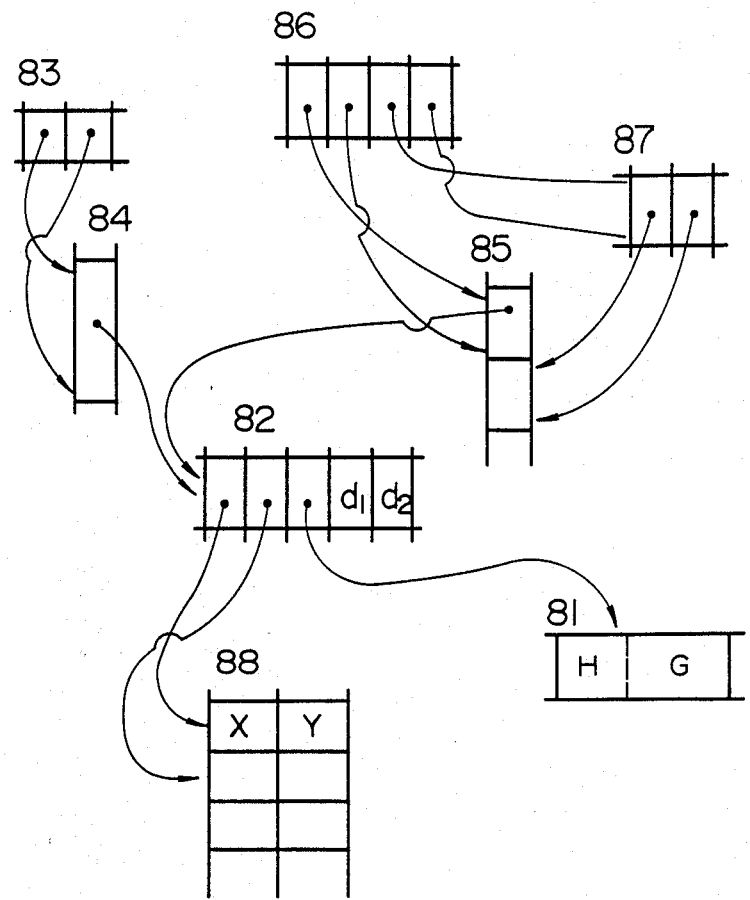

GEOMETRIC MODELLING SYSTEM

BACKGROUND OF THE INVENTION

The present invention relates to a geometric modeling system which constitutes a base for the construction of various automatic systems which automatically perform various works necessary in the design and production of goods with the aid of computers, such as systems known as CAE, CAD and CAM. More particularly, the invention is concerned with a geometric modeling system which is suitable for use in interactive operations.

In generating a three-dimensional form from two-dimensional wire frame patterns or figures which are typically produced by a drafting system, it is necessary that a three-dimensional surface be stored in a computer in such a mathematically complete form that the relationships of points, lines and surfaces are represented by a solid model in terms of boundary expression. To this end, it has been a common practice to employ a process which has the steps of cutting the wire frame which represents the boundary of the actual object out of the two-dimensional wire frame in accordance with the form of the object through an interactive method, appointing the cut wire frames sequentially so as to take up the surfaces or the boundaries of the surfaces which constitute the three-dimensional object, and synthesizing them so as to complete the three-dimensional form. This method is disclosed, for example, in pp 23–28, "COMPUTERS IN ENGINEERING 1982 Vol. 1" which was released in the Second International Computer Engineering Conference which was held in August, 1982.

The conventional graphic system, however, is not convenient for the users in that it requires a large number of command inputs in the interactive processing, as well as laborious inputting operations.

Another problem is that the two-dimensional wire frame pattern formed by the drafting system sometimes irregularly or incompletely indicate the states of intersection between the constituent lines such as straight lines and arcuate lines, so that the user cannot correctly recognize the states of intersection of the lines from the pattern on display. Therefore, the user must define again the data concerning such irregular and incomplete wire frame patterns, thereby to obtain regular and complete presentation, following laborious inputting steps.

It is to be pointed out also that the work for appointing the wire frames which represent the boundaries in the actual object and the work for visually recognizing the three-dimensional structure from the design drawings are not always conducted in concert with each other, with the result that the performance of the man-machine interface for inputting modeling commands is impeded seriously.

SUMMARY OF THE INVENTION

Accordingly, an object of the invention is to provide a geometric modeling system for generating a three-dimensional form from two-dimensional wire frame patterns, which system being improved in such a manner as to remarkably simplify the inputting process and to ensure a higher performance of the man-machine system, thus enabling easy operation by the users.

According to the invention, this object is achieved by a modeling system in which the user appoints internal points in a displayed two-dimensional wire frame patterns which represent surfaces as constituents of a three-dimensional object, whereby definite surfaces or boundaries of definite surfaces are automatically taken out with good matching, while checking the completeness of the double definition of the constituent line elements and the state of intersection and satisfying the geometrical relationship.

The above-mentioned object is achieved also by a method in which definite surfaces or the boundaries of the definite surfaces are automatically taken-out and a specific patterns with surface are appointed by the user.

The operation of the modeling system in accordance with the invention is as follows. As the user appoints the internal points in the two-dimensional wire frame patterns, an operation unit generates data concerning definite surfaces or boundaries of a definite surface, in accordance with the coordinate values appointed by the user and two-dimensional wire frame pattern data extracted from a data base. The operation unit then performs a three-dimensional process by using the thus obtained data concerning the definite surface or the boundaries of the definite surface. Alternatively, the definite surfaces or the boundaries of the definite surfaces are automatically taken out.

BRIEF DESCRIPTION OF THE DRAWINGS

FIG. 3 is an illustration of the process on a CRT display for the formation of the data in the processing section shown in FIG. 2;

FIG. 6A is an illustration of a process on a CRT display for the formation of a parallel sweeper for a closed solid body with curved surface;

FIG. 6B is an illustration of a process on a CRT display for the generation of a rotary sweeper of a closed solid body with curved surface;

FIGS. 7A to 7D are illustrations of a surface pick-up algorithm;

FIGS. 16, 17A, 17B, 18A, 18B, 19A, 19B, 20A, 20B, 21A, 21B, 22A, 22B, 23A, 23B, 24A, 24B, 25A, 25B, 26A, 26B, 27A, 27B, 28A and 28B are graphical representation of the states of retrieval of the groups of two-dimensional wire frames in respective steps, as well as the tree structures obtained in respective steps;

FIGS. 30A, 30B, 31A and 31B are illustrations of conditions for judgement as to whether the loop structure is for the inner loop retrieval;

FIG. 35 is a Table showing the data structures used in the loop retrieval.

DESCRIPTION OF THE PREFERRED EMBODIMENTS

A preferred embodiment of the invention will be described hereinafter with reference to the accompanying drawings.

A. Explanation of Whole System

Figure 1:
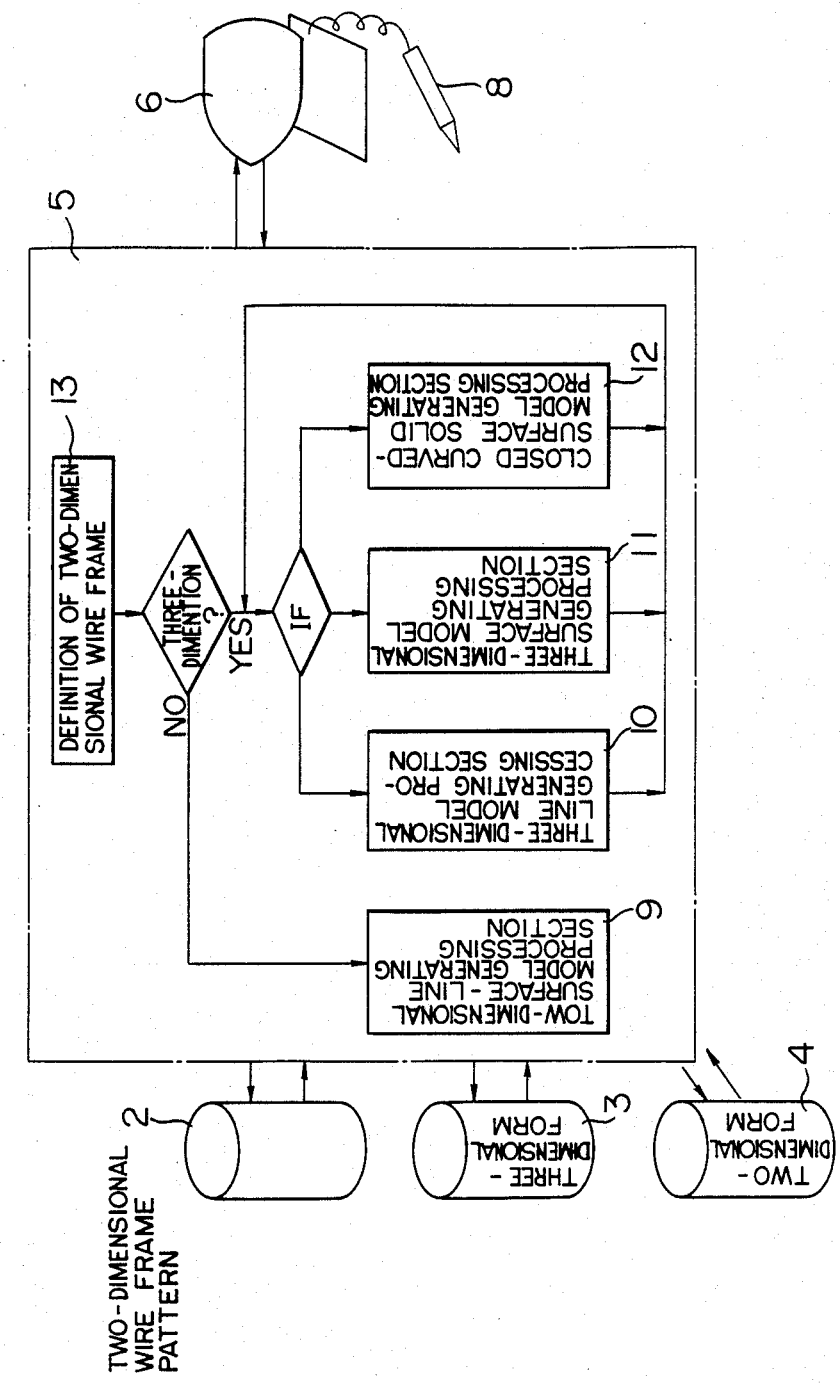
FIG. 1 is a block diagram showing constituent elements of an embodiment of the invention, as well as the flow of the process for generating a three-dimensional form.

As shown in FIG. 1, an interactive geometric modeling system embodying the present invention has the following parts: a graphic display 6; an input device 8 such as a combination of a tablet and a stylus or, alternatively, a keyboard, for inputting commands and parameters; an operation unit 5 which performs arithmetic operations in response to the input commands and parameters so as to generate two-dimensional wire frame pattern data in a two-dimensional wire frame defining section 13; and a data base 2 in which the thus-generated pattern data is stored.

The user operates the operation unit 5 through the input device 8 in accordance with the two-dimensional wire-frame pattern data extracted from the data base 2, so that two-dimensional or three-dimensional forms are generated in various sections including a two-dimensional surface/wire frame model generating processing section 9, three-dimensional wire frame model generating processing section 10, three-dimensional surface model generating processing section 11, and a closed curved-surface solid model generating processing section 12. The three-dimensional form data and the two-dimensional form data thus obtained are inputted to a data base 3 and a data base 4, respectively.

B. Method of Forming Three-Dimensional Surface Model

The details of the three-dimensional surface generating processing section, which has the processing arrangement commonly adopted by various form processing sections shown in FIG. 1, will be explained hereinunder with specific reference to FIG. 2.

B1. Outline of Surface Model Generating Process

Figure 2:
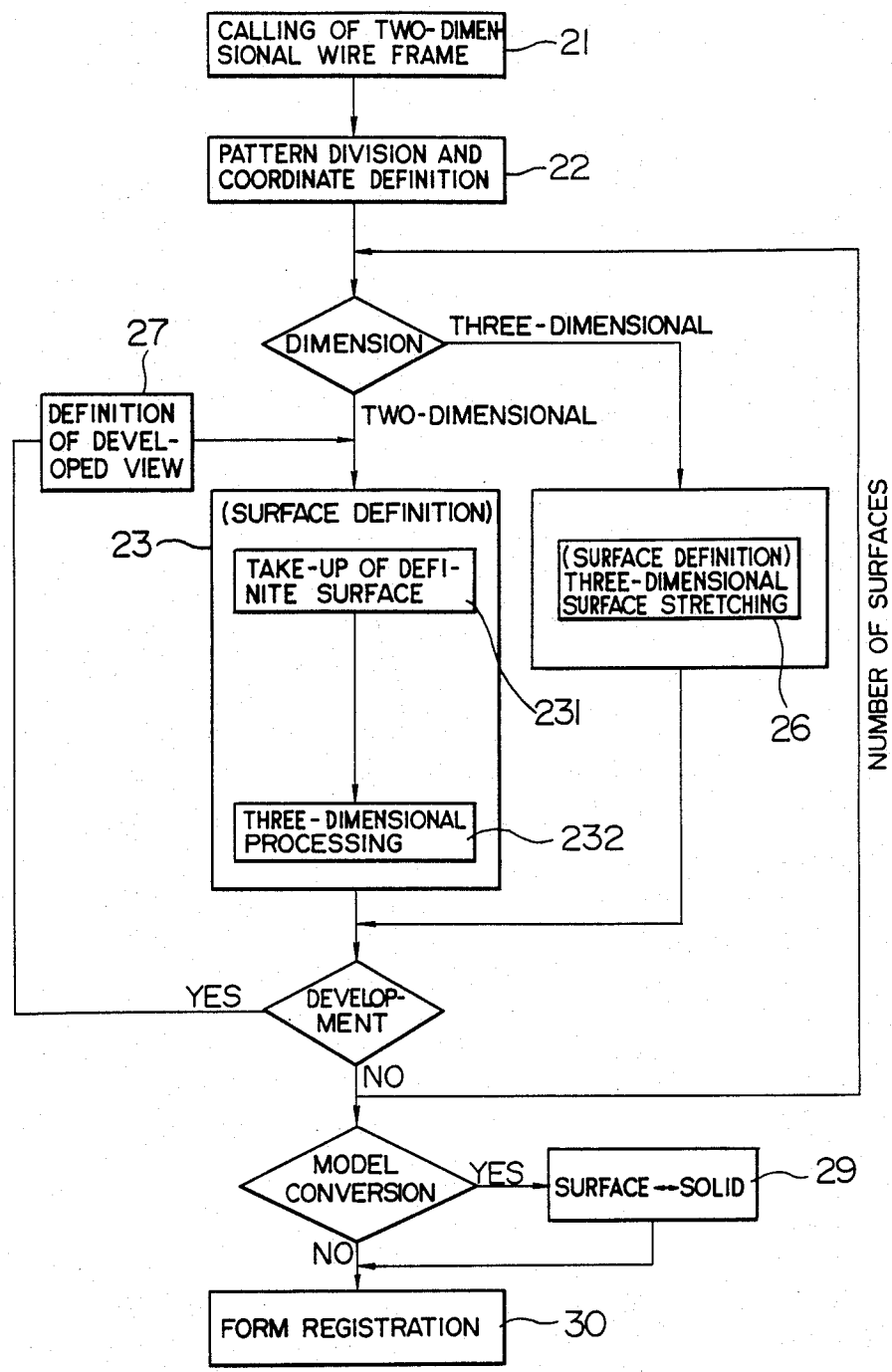
FIG. 2 is a detailed illustration of a three-dimensional surface generating processing section whose processing arrangement is common to the form processing sections shown in FIG. 1.

As will be seen from FIG. 2, the three-dimensional surface model generating process is constituted by the following commands and processing steps.

At Step 21, the user inputs a command for calling two-dimensional wire frames, as well as parameters thereof. In response to the input, the operation unit 5 calls, from the data base 2 (see FIG. 1), the data concerning the two-dimensional wire frame pattern generated and defined by, for example, a drafting system, and displays the thus called data on the display 6, as shown in frame 1 in FIG. 3. At Step 22, the user inputs commands and parameters for the division of the pattern and the definition of the coordinate systems. In response to this input, the operation unit 5 divides the displayed two-dimensional wire frame pattern into views such as a projection, a sectional view and a developed view, and defines these views as independent patterns, as shown in frame 2 in FIG. 3. Furthermore, the operation unit 5 defines the coordinate system for these independent patterns, the coordinate system determining the positional relationship between these independent patterns in a three-dimensional space.

For generating a three-dimensional form from the two-dimensional wire frame patterns, the user inputs at Step 23 a definite surface pick-up processing command, so as to appoint a point on the display representing the two-dimensional wire frame pattern or to appoint a pattern with an automatically-formed surface, the operation unit picks up a definite surface such as a projection surface, sectional surface, developing surface or the like at a Step 231 and, in a three-dimensional processing step (Step 232), a three-dimensional surface is formed from the thus picked-up definite surface, in accordance with a later-mentioned three-dimensional processing method, as shown in frame 3 in FIG. 3. The formation of the three-dimensional surface is conducted in such a way that the three-dimensional surface is combined with an already-generated three-dimensional wire frame, surface or a solid body, so as to obtain a matching necessary for a model. A step 27 is followed when it is desired to correct a generated three-dimensional surface on a developed pattern. The developed pattern has been obtained through developing a previously formed three-dimensional surface by the operation unit in accordance with the developed pattern defining command and parameter, and correcting the two-dimensional wire frame pattern having the thus obtained coordinate system.

For the purpose of generating a three-dimensional form from previously formed three-dimensional surfaces, points and lines constituting such a three-dimensional form are appointed at Step 26, so that a three-dimensional surfaces such as of fillets are formed, as shown in frame 6 in FIG. 3.

Then, Steps 23 to 27 are repeatedly executed until all the surfaces which constitute the desired three-dimensional model are formed.

When a model conversion is necessary, the closed surfaces are converted at Step 29 into a solid body, as shown in the frame 9 in FIG. 3. Conversely, a previously-formed solid body can be converted into a surface model provided that the conversion is carried out on the unit of surface.

The form data obtained through the above-mentioned process is registered in the three-dimensional form data base 3 at Step 30 for the form registration.

B2. Example of Interactive Processing

The process explained above in connection with FIG. 2 will be described in more detail using a practical form model, with specific reference to FIG. 3 which illustrates the process on a display on a CRT.

Referring to FIG. 3, the wire frame display in the frame 1 represents a group a of wire frames called at Step 21 shown in FIG. 2. A frame 2 shows a step for dividing the wire frames into patterns $a_1$ and $a_2$ and defining coordinate systems b for respective patterns. A frame 3 shows a surface definition process (three-dimensional processing). In this process, as an internal point P in the pattern $a_2$ or a specific pattern with an automatically-formed surface is appointed at Step 231 of the process shown in FIG. 2, a two-dimensional projection surface $f_1$ is formed. A wire frame $e_1$ of the pattern $a_1$ of the same three-dimensional object is also appointed at Step 232 of FIG. 2, a three-dimensional surface f is formed.

In a frame 6, there is shown a surface defining process (three-dimensional surface stretching process) in which a three-dimensional surface $f_3$ is formed as lines $e_2$ and $e_3$ constituting a previously-formed three-dimensional surface $f_2$ are appointed at Step 26 in FIG. 2. The boundaries of the three-dimensional surface are generated by effecting a development into a two-dimensional space on the basis of the input interpolation surface form, forming two-dimensional boundaries through a linear interpolation, and reforming the two-dimensional boundaries into three-dimensional space.

Figure 6C:
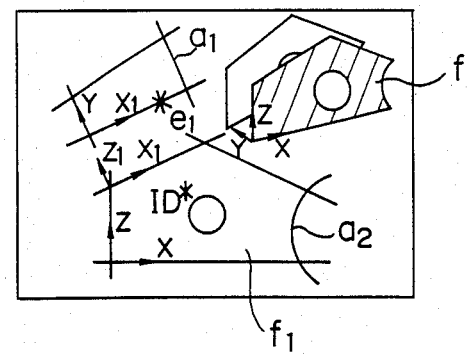
FIGS. 6C to 6E are illustrations of examples of specific pattern.
Figure 6D:
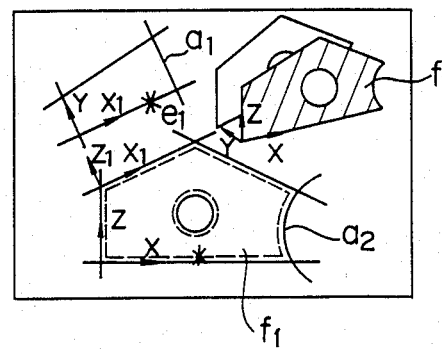
Figure 6E:
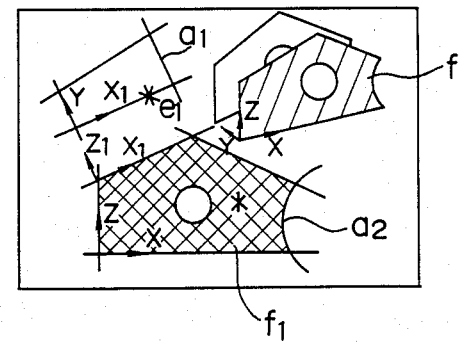

In frame 9, there is shown a surface-solid body conversion process in which a group $f_4$ of previously-formed closed surfaces is formed into a solid body in conformity with the direction c of the space representing the solid body, in accordance with Step 29 in the process shown in FIG. 2. FIGS. 6C to 6E show, respectively, the cases where the specific pattern with automatically-formed surface is constituted by a surface ID, surface boundaries and the shading inside the surface.

B3. Three-Dimensional Processing of Definite Surface

An explanation will be given hereinafter as to the method for three-dimensional presentation of a definite surface, with reference to FIGS. 4A to 5B. Explanation of the projection pattern is omitted because it has been described already in connection with the frame 3 illustrating the surface definition process (three-dimensional processing).

Figure 4A:
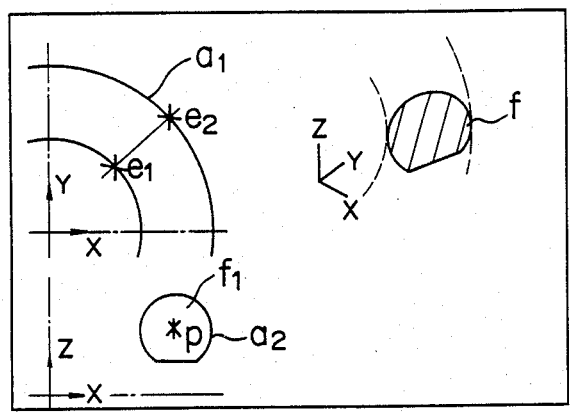
FIG. 4A is an illustration of a process on a CRT display for the generation of a three-dimensional form from a sectional view.
Figure 4B:
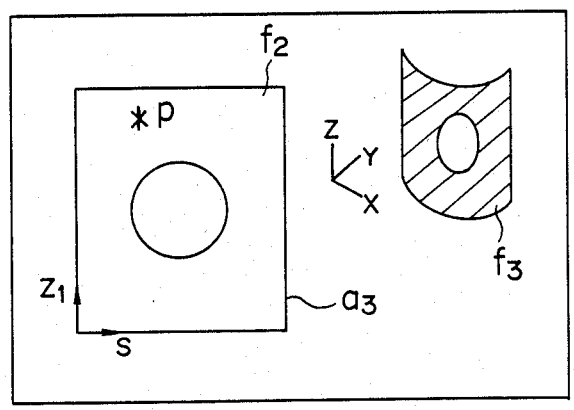
FIG. 4B is an illustration of a process on a CRT display for generation of a three-dimensional form from a developed view.

Referring to FIG. 4, for the purpose of making a three-dimensional presentation of a sectional view, a two-dimensional section $f_1$ is formed, as an internal point P in a pattern $a_2$ or a specific pattern with an automatically-formed surface (referred to as "specific pattern" hereinafter) is appointed at Step 23 of the process shown in FIG. 2. Then, at Step 232 of the process shown in FIG. 2, a point $e_1$ in the pattern $a_1$ of the same three-dimensional object and a point $e_2$ representing the same direction are appointed, thereby enabling the formation of the three-dimensional surface f.

On the other hand, a three-dimensional presentation of the developed pattern is conducted by appointing in Step 231 of the process shown in FIG. 2 an internal point P in a pattern $a_3$ or a specific pattern thereby forming a developed surface $f_2$ and then generating a three-dimensional surface $f_3$ in Step 232 of FIG. 2.

Figure 5A:
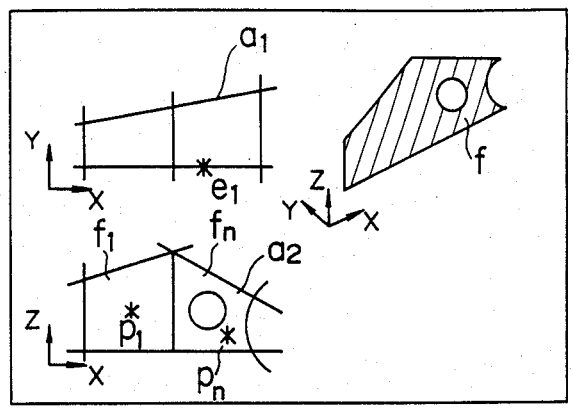
FIG. 5A is an illustration of the process on a CRT display for surface definition (three-dimensional processing) step 3 in FIG. 3, which process is taken when a plurality of internal points P are appointed.

When a circumstance allows appointment of a plurality of points, internal points $P_1$ to $P_n$ of the pattern $a_2$ or a specific pattern are appointed in Step 231 of FIG. 2 so as to form two-dimensional projection surfaces $f_1$ to $f_n$ and, thereafter, the wire frame $e_1$ of the pattern $a_1$ of the same three-dimensional object is appointed in Step 232 of the process shown in FIG. 2, whereby a three-dimensional surface f is formed, as in the case of the example shown in FIG. 5A.

Figure 5B:
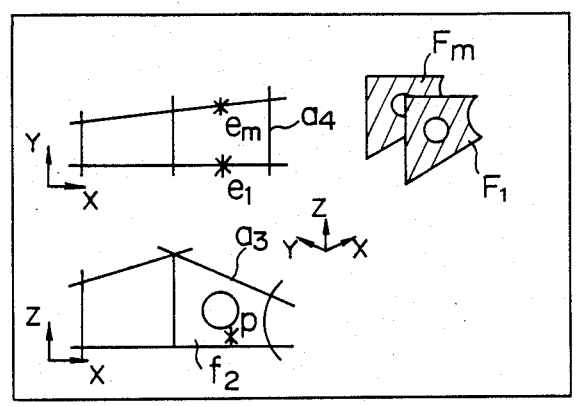
FIG. 5B is an illustration of a process on a CRT display for surface definition (three-dimensional processing) step 3 in FIG. 3, which process is taken when there are a plurality of wire frames e representing one and the same three-dimensional object.

An explanation will be given hereinafter as to the case where a plurality of three-dimensional surfaces are formed, with reference to FIG. 5B. As an internal point P in the pattern $a_3$ or a specific pattern is appointed in Step 231 of the process shown in FIG. 2, a two-dimensional projection surface $f_2$ is formed and, thereafter, a plurality of three-dimensional surfaces $F_1$ to $F_m$ are formed as the wire frames $e_1$ to $e_m$ of the pattern $a_4$ of the same three-dimensional object are appointed. It is also possible to appoint a plurality of wire frames $e_1$ to $e_m$ of the same three-dimensional object, by appointing a plurality of internal points $P_1$ to $P_n$ or a specific pattern.

Although the method of three-dimensional presentation of a projection pattern has been described with reference to FIGS. 5A to 5B, the same method applies also to the formation of a three-dimensional form from a sectional pattern or a developed pattern. It is not always necessary that the internal points $P_1$ to $P_n$ shown in FIG. 5A are of the same pattern. Similarly, it is not always necessary that the wire frames $e_1$ to $e_m$ shown in FIG. 5B are of the same pattern.

From the foregoing description, it will be understood how the three-dimensional model generating pattern is generated.

C. Method of Generating Two-Dimensional Surface Model and Solid Model

The two-dimensional surface-wire frame model generating processing section 9 and the closed curved-surface solid model generating processing section 12, which are shown in FIG. 1, have an arrangement substantially the same as that for the three-dimensional surface model generating processing explained above. Portions of respective processings, which are critical to the present invention, will be explained hereinunder.

In the two-dimensional surface-wire frame model generating processing section 9, the data formed in the definite surface pick-up step 231 shown in FIG. 2 is directly inputted to the two-dimensional form data base 4 as shown in FIG. 1.

On the other hand, at the curved-surface solid model generating processing step, the two-dimensional surface $f_1$ is picked-up as the internal point P in the pattern $a_1$ or a specific pattern is appointed as shown in FIG. 6A. Then, the amount $c_1$ of translational movement is input, while the point $e_1$ of the pattern $a_2$ of the same three-dimensional object and a point $e_2$ representing the direction are appointed, whereby a parallel sweeper $s_1$ is generated. At the same time, an internal point P in the pattern $a_1$ or a specific pattern is appointed to enable the pick-up of the two-dimensional surface $f_1$ as shown in FIG. 6B. Then, the coordinate axis $e_1$ of the pattern $a_1$ is appointed, and the amount $c_1$ of rotation about the axis $e_1$ is inputted, followed by appointment of a point $e_2$ in the pattern $a_2$ and the point $e_3$ representing the direction, whereby a rotary sweeper $s_1$ can be obtained. The sweepers thus obtained are processed for the purpose of integration with a previously-formed closed curved-surface solid body, whereby the desired closed curved-surface solid body is formed.

As will be understood from the foregoing description, according to this embodiment of the invention, it is possible to pick-up the definite surface for the formation of a three-dimensional body or the boundaries of such definite surfaces, simply by appointing one point or a specific pattern in a two-dimensional wire frame pattern on display. This in turn enables a remarkable reduction in the number of commands to be input by the user. In addition, the direct appointment of surfaces representing the actual form can be kept up with the process of recognition of the three-dimensional surfaces by the user on the design drawings. The direct appointment also enables the user to work out a three-dimensional pattern through the same inputting operation, regardless of whether it is formed from a projection, sectional view or a developed view. This means that the performance of the man-machine interface has been improved significantly.

D. Method of Forming Definite Surface

D1. Basic Forming Method

The algorithm for the generation of a three-dimensional form on the basis of the appointment of an internal point conducted in the definite surface pick-up processing step 231 shown in FIG. 2 will be explained hereafter with reference to FIGS. 7A and 7B, as well as to FIGS. 8A to 8F which illustrate the CRT displays of a model having a practical form.

First of all, an explanation will be given as to a method for retrieval of an outer loop which constitutes the minimal region containing an appointed point.

Figure 7A:
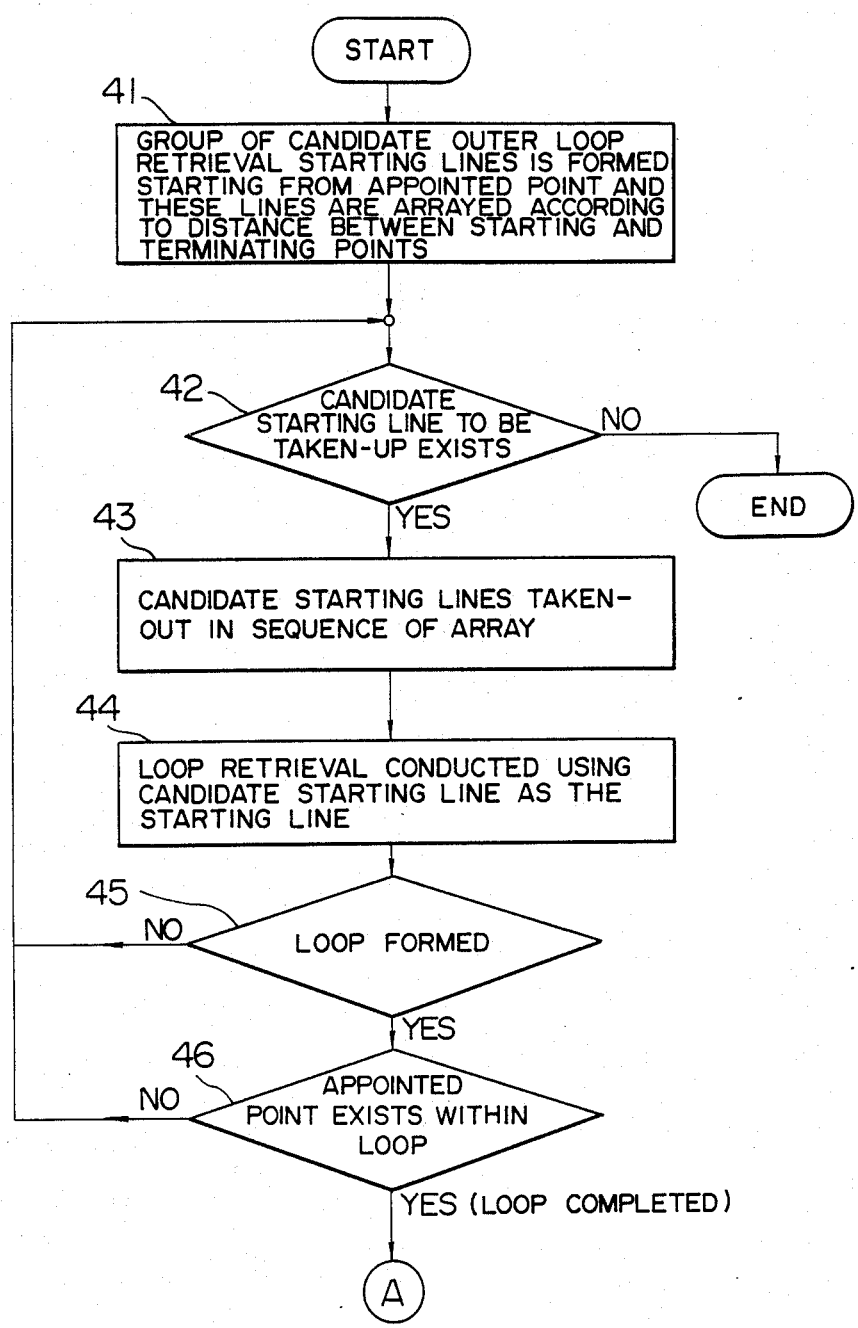
Figure 8A:
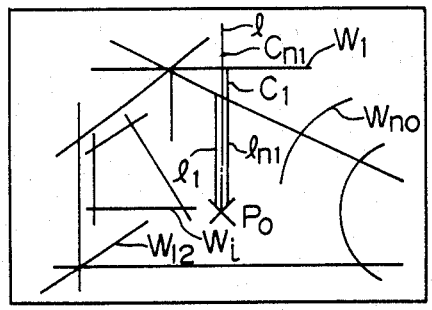
FIGS. 8A to 8F are illustrations of a practical model on a CRT display, explaining the surface pick-up algorithm.
Figure 8B:
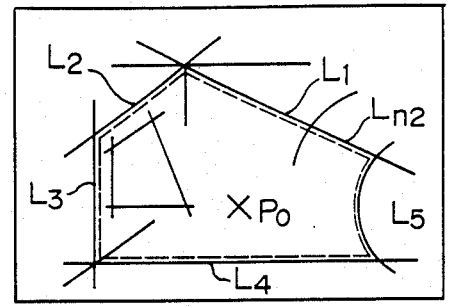

The operation executed in Step 41 in FIG. 7A is as follows. Referring to FIG. 8A, points of intersection or contact between a half-line ( starting at an appointed point $P_o$ and a group of wire frames $W_1-W_{no}$ are represented by $c_1-c_{n1}$, and a plurality of lines starting at the appointed point $P_o$ and terminating at the points $c_1-c_{n1}$ are drawn, thus forming a group of candidate retrieval starting lines. These lines are arrayed according to the distance between the starting and terminating points, from the smallest one to the greatest one, as represented by $l_1-l_{n1}$.

In Steps 42–46 shown in FIG. 7A, a retrieval operation is conducted to pick-up the outer loop $$\sum_{i=1}^{n2} L_i$$

containing the appointed point $P_o$ and having the smallest length, in accordance with the order of the candidate retrieval starting lines arrayed as described above, as shown in FIG. 8B. The detail of the outer loop retrieval method will be explained later.

An explanation will be given hereinafter as to the method of retrieving a group of inner loops, i.e., loops contained by the outer loop. At Step 47 of the process shown in FIG. 7B, a group of wire frames contained by the outer loop are cut out at connecting or crossing points from a group of wire frames $W_1$ to $W_{no}$ shown in FIG. 8A, and the thus cut wire frames are determined as a group of candidate edge lines $i_1-i_{n3}$, as shown in FIG. 8C. As shown in FIG. 8D, the operation performed at Steps 48 and 49 shown in FIG. 7B is as follows. A half-line m is drawn starting from the end of any unretrieved candidate edge line $i_1$ of the picked-up group of candidate edge lines $i_1$ to $i_{n3}$ shown in FIG. 8, the half-line m extending in parallel with and in the positive direction (upward direction in the figure) of y-axis of a two-dimensional coordinate system (frame coordinate system) having a horizontal x-axis and vertical y-axis which has the point of origin located at a left lower point on the CRT display. Then, a group of candidate inner loop retrieval start lines, which terminate at points $q_1-q_{k1}$ of intersection or contact between the half line m extending to the infinite point $P_i$ in the positive direction (upward direction in the figure) and the candidate edge lines $i_1$ to $i_{n3}$ shown in FIG. 8C, and these candidate starting lines are arrayed according to the distance, from the smallest to the greatest, as represented by $m_1-m_{k1}$. Then, inner loop retrieval is conducted using the candidate inner retrieval starting lines in the sequence of the array.

Figure 7B:
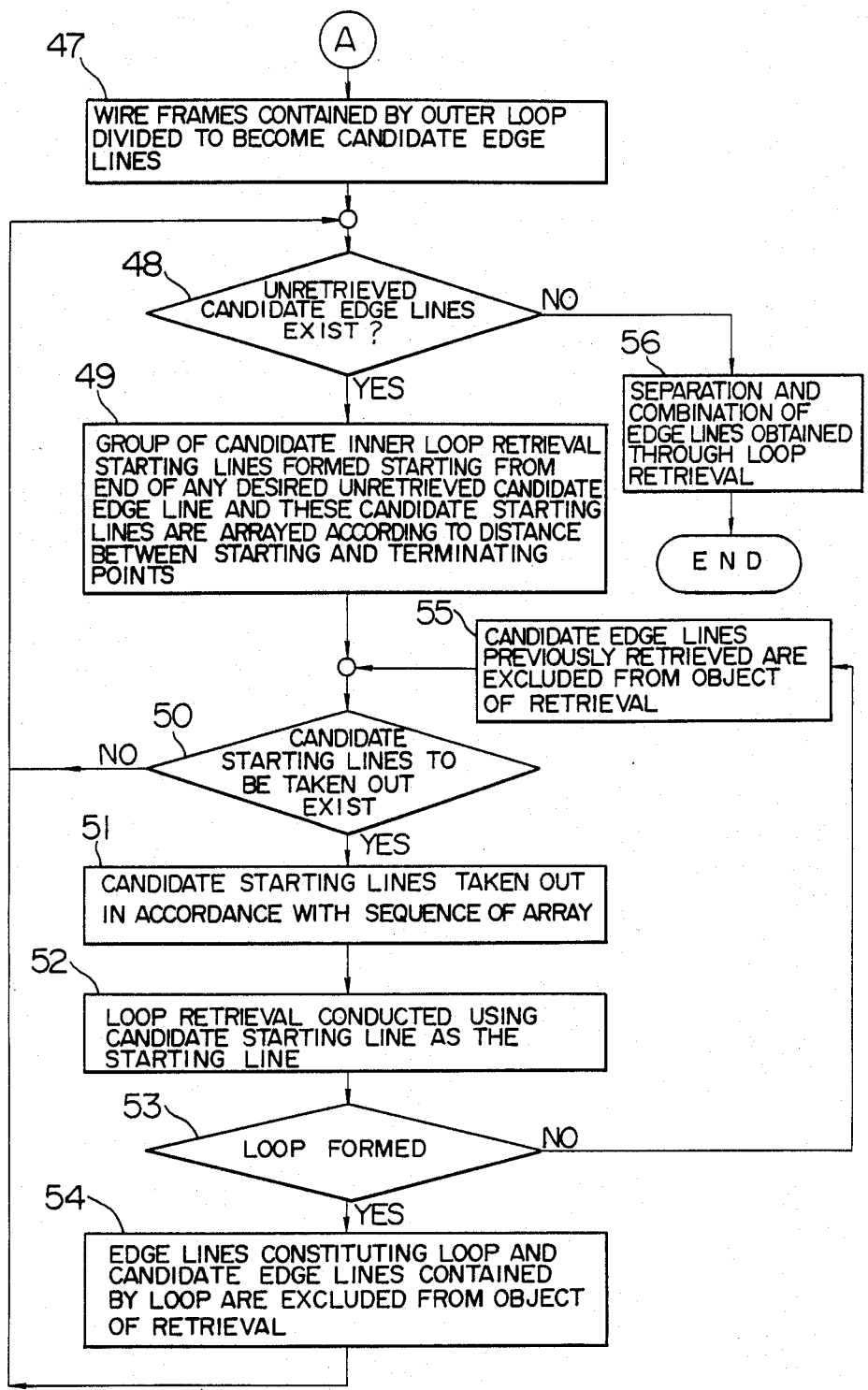
Figure 8C:
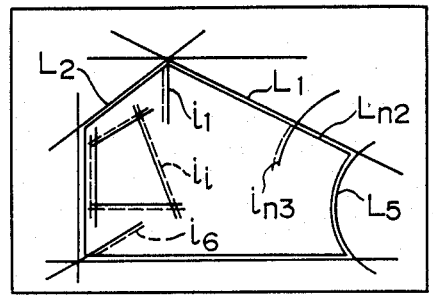
Figure 8D:
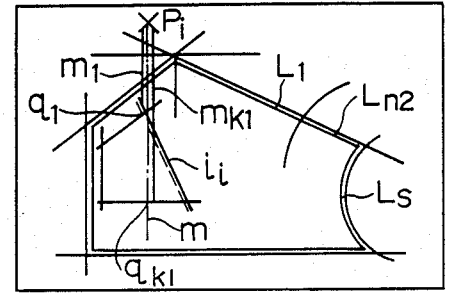
Figure 8E:
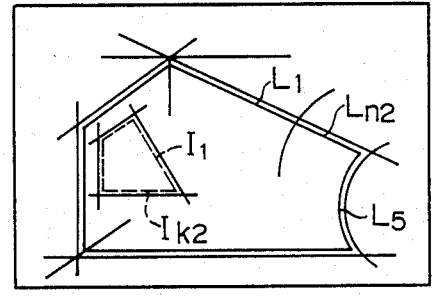

At Steps 50 to 53 of the process shown in FIG. 7B, the inner loop $$\sum_{i=1}^{k2} I_i$$

is retrieved in accordance with the sequence of array of the candidate inner loop retrieval starting lines, as shown in FIG. 8E.

The detail of the inner loop retrieval will be explained later. When the loop has not been completed yet, the candidate edge lines retrieved at Step 52 is excluded from the next loop retrieval processing step 52 at Step 55 shown in FIG. 7B.

Figure 8F:
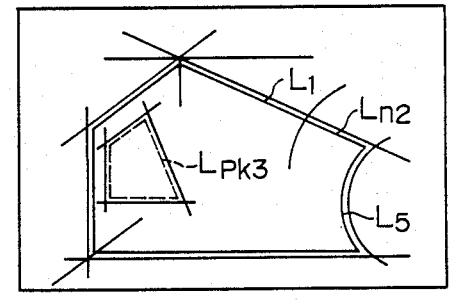

After completion of the inner loop, the edge lines constituting the completed loop and candidate edge lines contained by this loop are excluded from the next processing steps 48, 49 and 52, at Step 54 shown in FIG. 7B. The steps 48 to 55 explained above are followed until no unretrieved candidate edges is left, whereby an inner loop $$\sum_{i=1}^{k3} LP_i$$

is picked-up as shown in FIG. 8F.

Then, Step 56 shown in FIG. 7B is executed in which the outer loop and the inner loop obtained through the loop retrieval are subjected to separation and synthesis of the edge lines for the outer and inner loops through a method which will be detailed later, thus defining the loops again.

From the foregoing description, it will be understood how the three-dimensional form is generated through appointment of internal points.

Figure 7D:
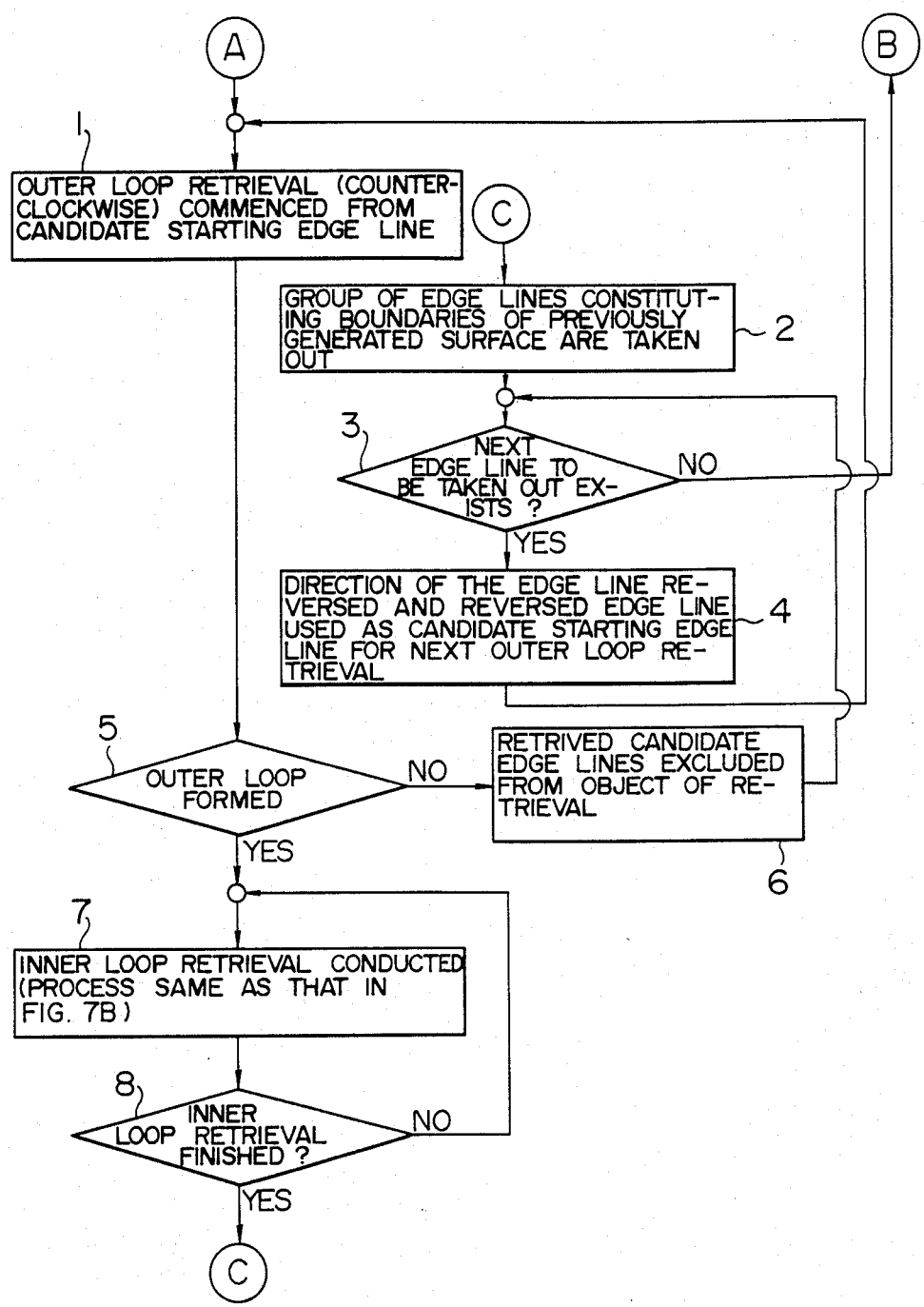

The formation of the three-dimensional form through appointment of specific patterns with automatically-formed surface at the definite surface pick-up processing step 231 of the process shown in FIG. 2 is carried out in a manner which will be explained hereinunder. In this case, an inner loop retrieval method which will be explained later applies to the retrieval of the outer loop starting lines and the judgement of the loop construction, as shown in FIGS. 7C to 7D. In this case, the lines counter to the group of edge lines constituting the boundaries of the previously-formed surfaces are used as the group of candidate starting lines and adjacent surfaces are successively formed using these starting lines. The patterns with these surfaces, such as the surface ID in FIG. 6C, boundaries of the surface shown by broken lines in FIG. 6D, or the shading indicated by the mesh shown in FIG. 6E are beforehand presented on the display.

Figure 9:
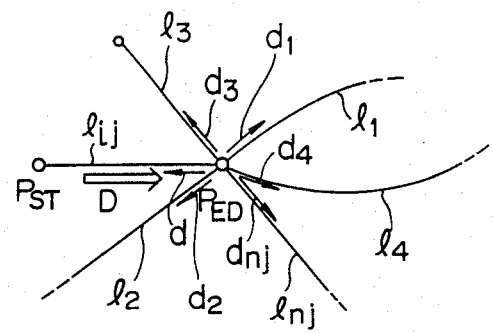
FIGS. 9 to 12 are illustrations of a process in which a tree structure of the data for loop retrieval is formed on the basis of a wire frame having a direction D in any desired two-dimensional wire frame.

The detail of the outer loop and inner loop retrieval procedures will be explained in connection with FIG. 9 and following Figures. A group of edge lines constituting the outer loop and the inner loop are picked-up from a two-dimensional wire frame group as an object of the loop retrieval. This can be conducted by forming a tree structure of data from a group of candidate wire frames, and forming a loop through retrieval of the tree structure. This processing method applies both to the outer and inner loops.

Figure 10:
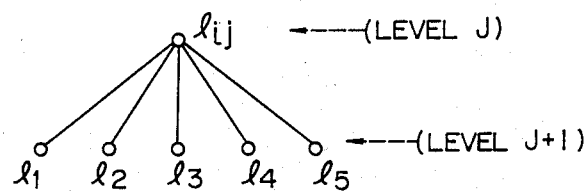
Figure 11:
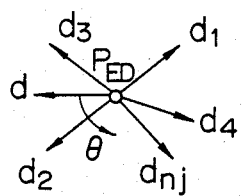
Figure 12:
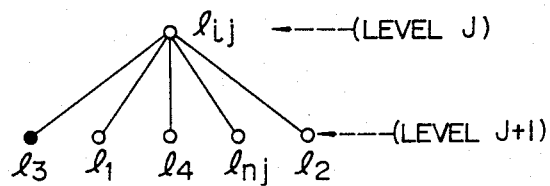

To explain in more detail, a tree structure is formed from a group of given two-dimensional wire frames in the following manner. For the purpose of simplification of explanation, it is assumed here that the two-dimensional wire frames have been cut at their connecting or intersecting points. FIG. 9 shows a process of loop retrieval of a two-dimensional wire frame pattern. In this process, it is assumed that the wire frame $l_{ij}$ having an orientation D is a parent, while a group of wire frames $l_1$ to $l_{nj}$ connected together at a point $P_{ED}$ constitute children. A tree structure of data as shown in FIG. 10 can be obtained using these wire frames. Representing the level of the wire frame $l_{ij}$ in the tree structure by j, the level of the wire frames $l_1$ to $l_{nj}$ as children is represented by (j+1). Referring back to FIG. 9, a contact vector counter to the parent wire frame $l_{ij}$ and starting from the terminal point $P_{ED}$ of the wire frame $l_{ij}$ is represented by d. Also, a group of contact vectors $d_1$ to $d_{nj}$ starting from the point $P_{ED}$ are assumed for respective children wire frames. The candidate wire frames $l_1$ to $l_{nj}$ are then arrayed according to the angle $\theta$ of their contact vectors $d_1$ to $d_{nj}$ from the contact vector d as measured in counter-clockwise direction, from the greatest to the smallest as shown in FIG. 11. Thus, the children of the level (j+1) generated from the parent of the level j are arrayed as $l_3, l_1, l_4, l_{nj}$ and $l_2$ as illustrated in FIG. 12. The loop retrieval is carried out using these children wire frames successively as the parent of the next level in the tree structure. Thus, in the loop retrieval shown in FIG. 9, the wire frame $l_3$ is used as the parent of the level (J+1) in the tree structure. When the wire frame $l_3$ is not intersected by nor connected to any other wire frame, the operation is not conducted for generation of a tree structure using this child wire frame as a parent, as marked by a black circle in FIG. 12, but the operation is conducted for the generation of the tree structure using the child wire frame $l_1$ of the next order as the parent. The generation of the tree structure is continued until a loop is formed or until the retrieval is finished with all the two-dimensional wire frames which are the objects of the retrieval. Different conditions are used for the judgement of formation of the outer loop and the inner loop, as will be explained later in detail.

In the described embodiment, it has been estimated that the given wire frames are not divided at the crossing points nor connected at terminal points. Namely, the wire frames formed as the drafting data are used as they are. It is, therefore, necessary to conduct division of the wire frames, as well as connection at the terminal points, in conducting the loop retrieval through the formation of the tree structure.

Figure 13A:
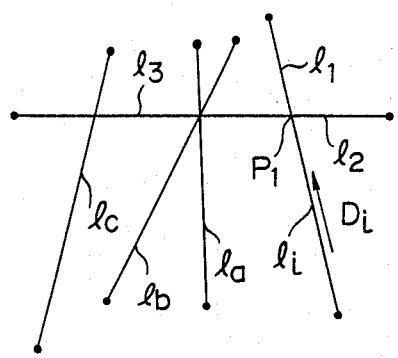
FIGS. 13A, 13B, 14A and 14B re illustrations of the manner in which, when a wire frame is divided, the "parent" wire frame is substituted, in the process for forming the tree structure in the loop retrieval.
Figure 13B:
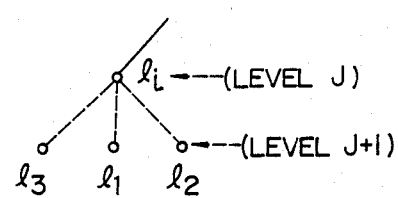
Figure 14A:
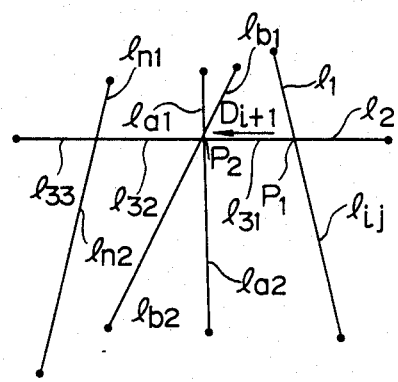
Figure 14B:
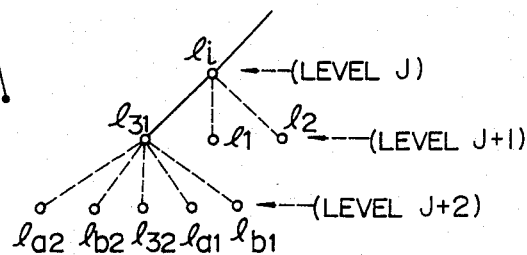

It is assumed here that an outer loop retrieval is being conducted in the state of wire frame as shown in FIG. 13A, using the wire frame $l_i$ in the direction of vector $D_i$ as the parent of the level j in the tree structure. Thus, wire frames $l_1$, $l_2$ and $l_3$ constitute the children wire frames of the level (J+1). As explained before, these wire frames are arrayed on the order of the angles of the contact vectors a the point $P_1$, as represented by $l_3, l_1, l_2$, so that a data tree structure as shown in FIG. 13B is formed. The wire frame $l_3$ is used as the parent of the (J+1) level in the outer loop retrieval. As shown in FIG. 13A, the wire frame $l_3$ crosses the wire frames $l_a$, $l_b \ldots l_n$. Therefore, at the moment at which the wire frame $l_3$ is selected as the parent of the level (j+1) in the data tree structure, the wire frames $l_3, l_a, l_b \ldots l_n$ are divided at respective crossing points. More specifically, the wire frame $l_3$ is divided into $l_{31}, l_{32}$ and $l_{33}$, while wire frames $l_a$ and $l_b$ are divided into $l_{a1}$ and $l_{a2}$, and $l_{b1}$ and $l_{b2}$, respectively. Similarly, the wire frame $l_n$ is divided into $l_{n1}$ and $l_{n2}$. At this moment, the wire frame constituting the parent of the level (j+1), i.e., the wire frame $l_3$ in FIG. 13A, is replaced by the first wire frame $l_{31}$ which is the first division from the wire frame $l_3$ and extending in the direction $D_{i+1}$ of the loop retrieval. At the same time, the wire frame $l_3$ is erased from the data processing and, hence, does not exist any more. Thus, the wire frame $l_{31}$ is used as the parent wire frame of the level (j+1) in the tree structure as shown in FIG. 14B. Then, only the wire frames $l_{a1}, l_{a2}, l_{32}, l_{b1}$ and $l_{b2}$ which are connected to the wire frame at the terminal point $P_2$ are taken out from among the divisional wire frames, and are arrayed according to the angle of the contact vectors at the point $P_2$, as represented by $l_{a2}, l_{b2}, l_{32}, l_{a1}, l_{b1}$, whereby children wire frames of a level (J+2) are formed. As explained before in connection with Step 47 in FIG. 7B, in case of the inner loop, the loop retrieval operation is carried out first by picking up the wire frames contained by the outer loop and then cutting these wire frames at their points of crossing and connection, so that the necessity for the substitution of the parent due to the cutting of the wire frame is eliminated.

An explanation will be made hereinunder with reference to FIGS. 15 to 18B as to the process in which, using the retrieval starting lines given by the generation of tree structures explained above, edge lines of loops constituting the outer loop or the inner loop are extracted from a group of two-dimensional wire frames as the loop retrieval. This process basically applies both to the outer loop and the inner loop, although there is a difference in judgement as to whether the replacement of parent as a result of division of the wire frame is conducted or not and as to whether the completion of the loop is in success or not.

Figure 15:
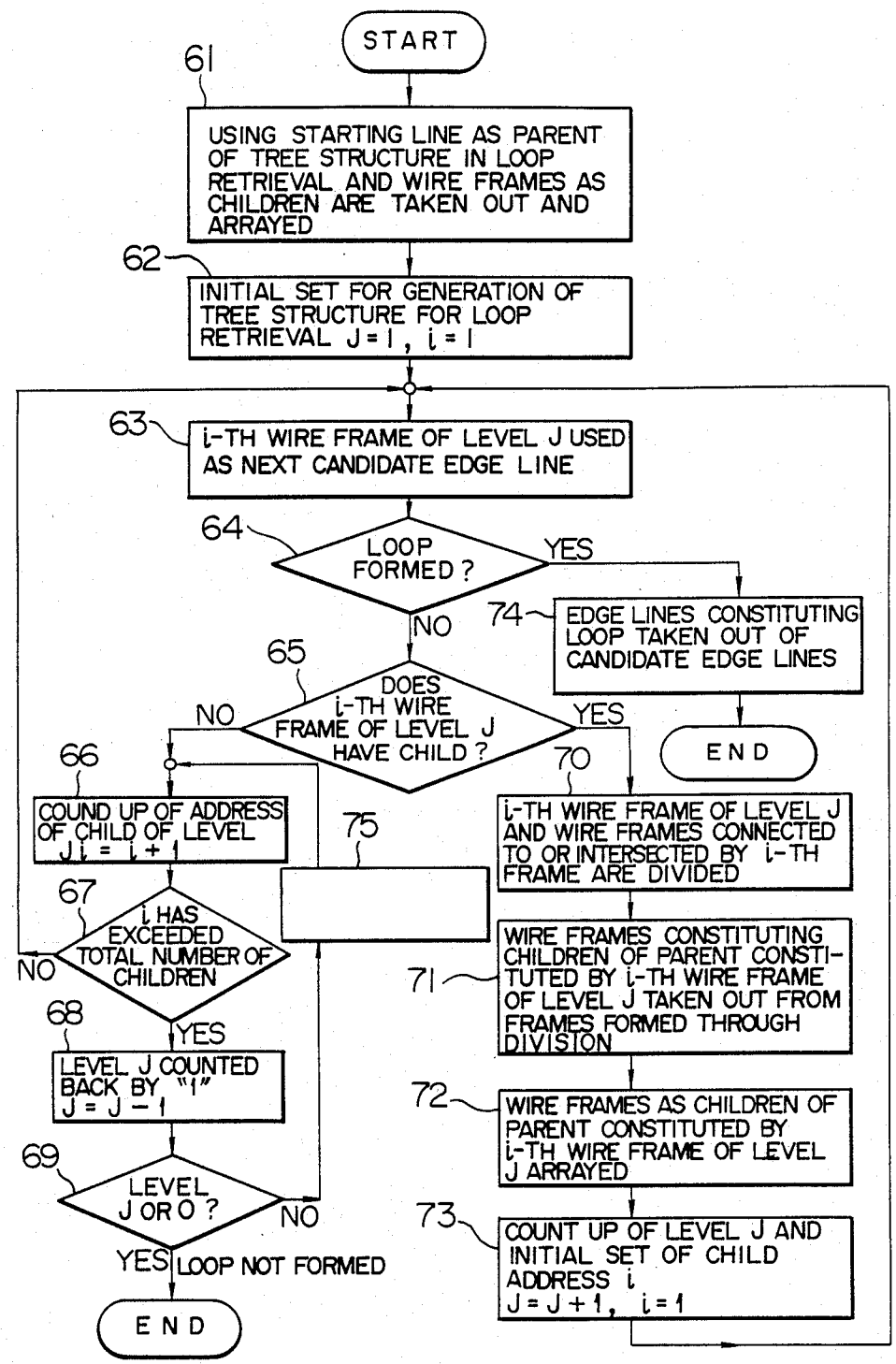
FIG. 15 is an illustration of a process in which a loop retrieval is conducted for a two-dimensional wire frame as an object, from a given starting line.
Figure 16:
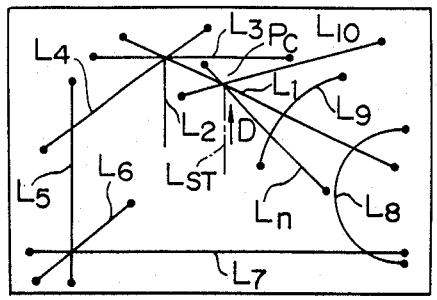
Figure 17A:
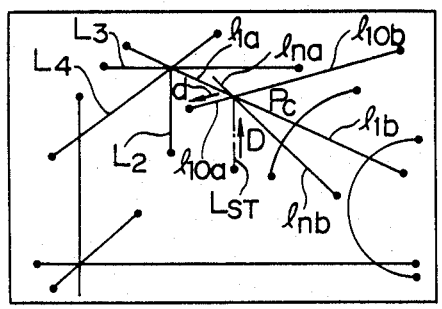
Figure 17B:
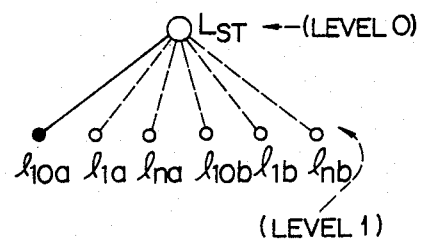

First of all, at Step 61 shown in FIG. 15, a given starting line is used as the parent of level 0 (zero) in order to form a tree structure for the loop retrieval, and wire frames constituting the children of the parent wire frame are taken out and arrayed in accordance with the procedure explained before. Assuming here that a starting line $L_{ST}$ having the direction D is given for the two-dimensional wire frames as shown in FIG. 16, all the wire frames $L_1$, $L_{10}$ and $L_n$ passing through the terminal point $P_c$ of the starting line $L_{ST}$ constitute the children wire frames. In either case of the outer loop retrieval and inner loop retrieval, the group of wire frames $L_1$, $L_{10}$ and $L_n$ are cut at the point $P_c$ and the divisions of these wire frames are arrayed as $l_{10a}, l_{1a}, l_{na}, l_{10b}, l_{1b}$ and $l_{nb}$ as shown in FIGS. 17A and 17B, so as to be used as the children of the level "1" in the tree structure. Then, the formation of the tree structure is commenced using the first wire frame amongst the children wire frames of the level "1". Namely, initial setting of the level and the address of this wire frame is conducted in Step 62 in FIG. 15. In the example shown at FIG. 17A, the wire frame $l_{10a}$ is selected as the first candidate edge line of the first level, as shown in FIG. 17B. This is conducted at Step 63 shown in FIG. 15. Then, the process proceeds to Step 64 in FIG. 15, in which a judgement is done as to whether the selected candidate edge line constitutes a loop. Different judging method apply to the outer loop and the inner loop, as will be detailed later. If the judgement at Step 64 has proved that a loop is formed, the process proceeds to Step 74 shown in FIG. 15 in which a group of edge lines forming the loop are extracted from the group of candidate edge lines obtained through the loop retrieval, thus completing the process. In the example shown in FIG. 17A, the wire frame $l_{10a}$ does not constitute any loop, so that the process proceeds to Step 65 shown in FIG. 15. Since the i-th candidate edge line of the level J does not constitute any loop, it is necessary that children wire frames of the next level are formed using this candidate edge line wire frame as the parent. To this end, at Step 65, a judgement is done as to whether this parent wire frame has any child, i.e., as to whether this wire frame is crossed by or connected to any other wire frame in the direction of the loop retrieval, i.e., in the direction from the starting point of the wire frame to the terminal point of the same. Since the wire frame $l_{10a}$ in FIG. 17A has neither crossing nor connection in the direction d, this wire frame does not have any child so that it is marked by a black circle in FIG. 17B. As a result, the process proceeds to Step 66 shown in FIG. 15. At Step 66, therefore, a wire frame of the same level as the i-th wire frame of the level J and next to this wire frame, i.e., the wire frame addressed at i+1 is selected as the parent. This wire frame is shown by $l_{1a}$ in FIG. 17B. In case of FIG. 17B, it is possible to renew the address of the child wire frame from $l_{10a}$ to $l_{1a}$. In such a case, there would be such a case that the address i of the child after the renewal of the address exceeds the total number of the children. At Step 67, therefore, a judgement is conducted as to whether the total number of the children is exceeded.

If the total number of the children is exceeded by the address of a child, the level is brought back by "1" to J, at Step 68 shown in FIG. 15. If the level J is not 0 (zero), a retrieval is conducted at Step 75 of the process shown in FIG. 15 to search the address i of the child in the J level, and the process proceeds to Step 66. Conversely, the fact that the level J is 0 (zero) at Step 69 means that the loop could not be formed even after the loop retrieval of all the two-dimensional wire frames. In this case, therefore, the processing is finished. In the case of the example shown in FIG. 17B, the process is returned to Step 63 as a result of judgement at Step 67, thus continuing the process.

Figure 18A:
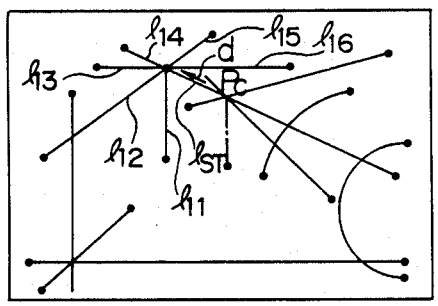
Figure 18B:
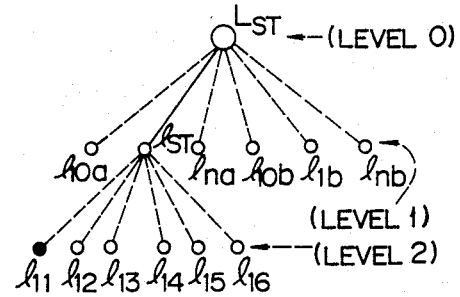
Figure 22A:
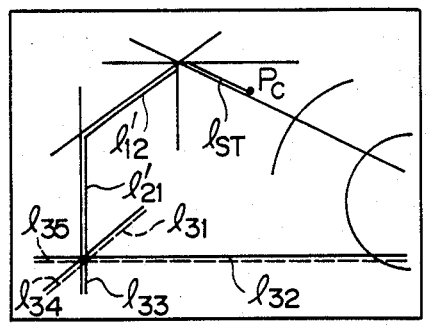
Figure 22B:
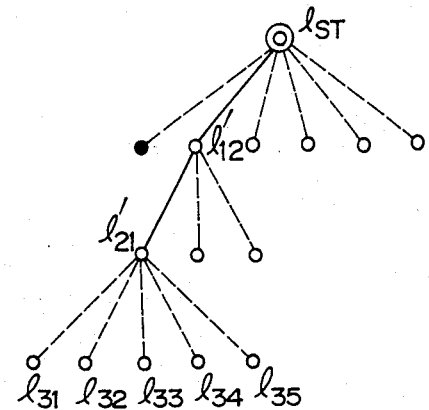
Figure 23A:
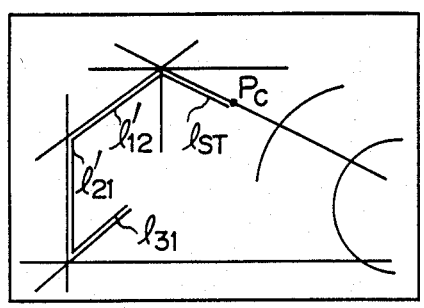
Figure 23B:
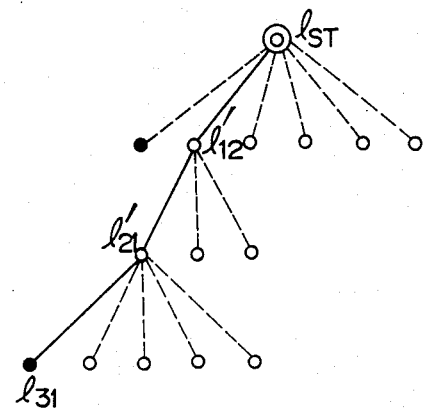
Figure 24A:
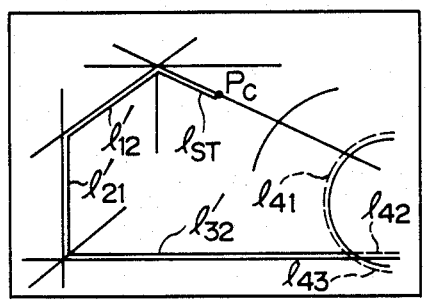
Figure 24B:
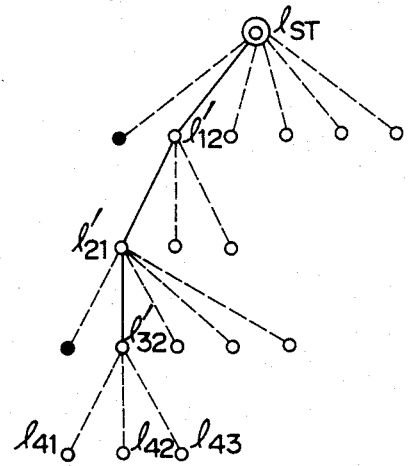
Figure 25A:
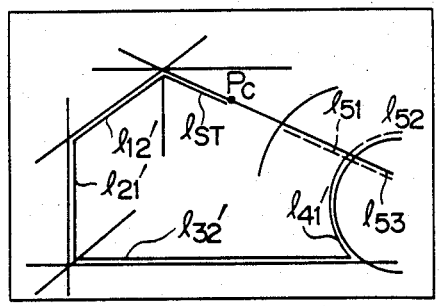
Figure 25B:
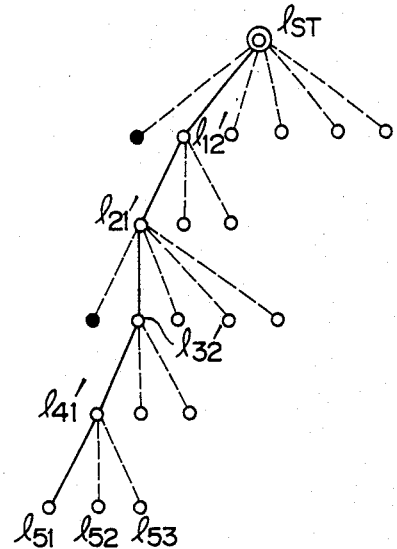
Figure 26A:
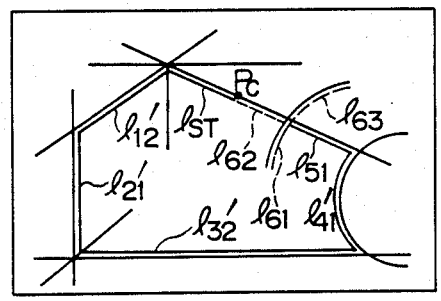
Figure 26B:
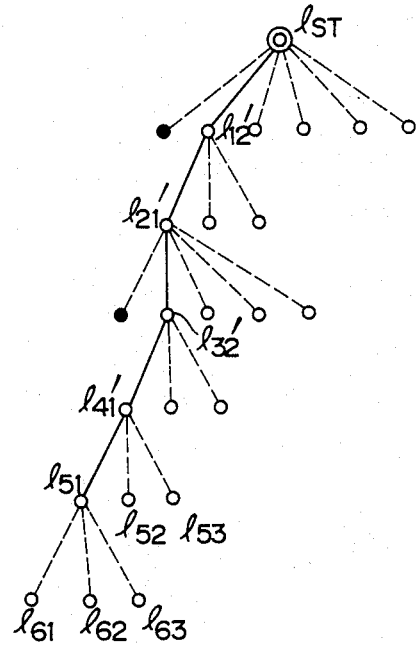
Figure 27A:
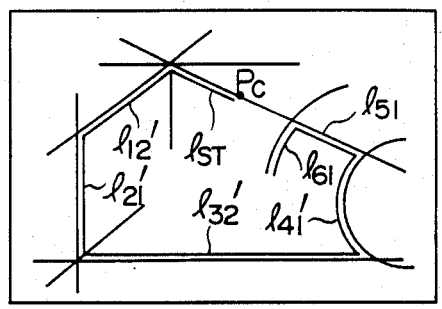
Figure 27B:
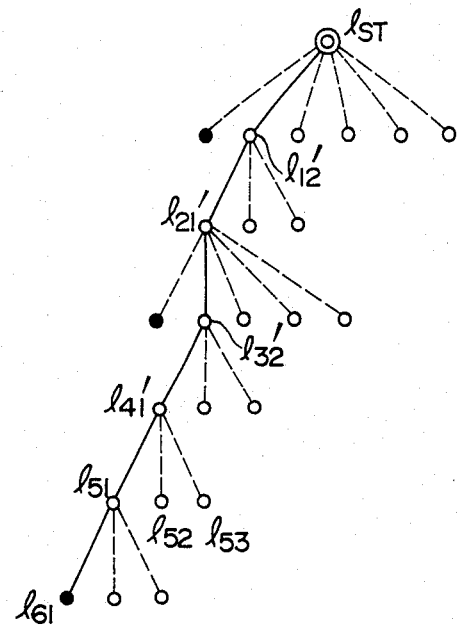
Figure 28A:
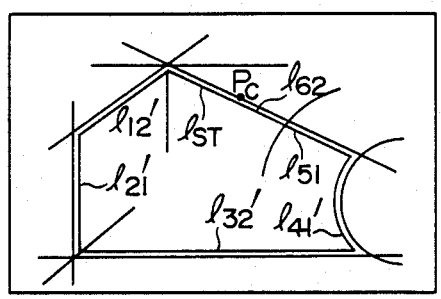
Figure 28B:
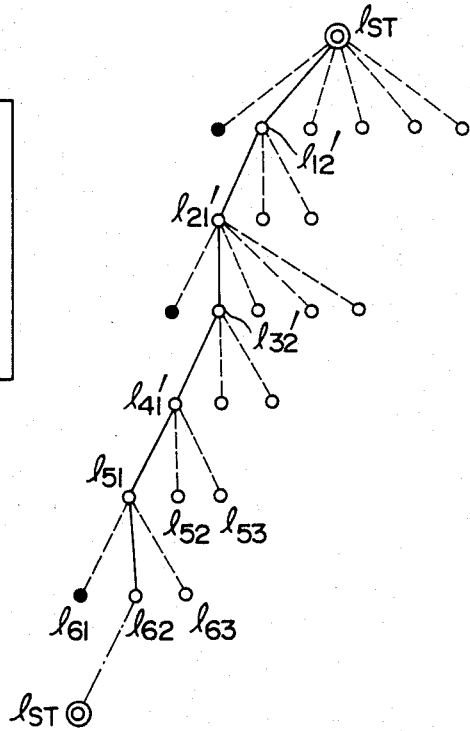

It is assumed here that an outer loop retrieval is being conducted for the wire frames shown in FIG. 17A. In this case, the process returns to Step 63 and then to Step 64 in FIG. 15. Since the wire frame $l_{1a}$ does not constitute any loop, the process proceeds to a judging Step 65 in FIG. 15. In this case, the wire frame $l_{1a}$ used as the parent has children because it crosses wire frames $L_2$, $L_3$ and $L_4$, so that the process proceeds to Step 70 in FIG. 15. Since the present retrieval is for the outer loop, it is necessary to pick-up the wire frames constituting the parent and children through division of the wire frames for the purpose of generation of the tree structure. This is conducted in Steps 70 and 71 in FIG. 15. Namely, as shown in FIG. 18A, the wire frame $l_{1a}$ is divided into wire frames $l_{ST}$ and $l_{14}$, $L_3$ is divided into $l_{13}$ and $l_{16}$, and $L_4$ is divided into $l_{12}$ and $l_{15}$. On the other hand, the wire frame $L_2$ is connected to the wire frame $l_{1a}$ to form a wire frame $l_{11}$. Then, as explained before, the parent wire frame $l_{1a}$ is replaced with $l_{ST}$ and the group of wire frames $l_{11}$, $l_{12}$, $l_{13}$, $l_{14}$, $l_{15}$ and $l_{16}$ as the children of the new parent wire frame $l_{ST}$ are taken out and arrayed. This operation is conducted at Step 72 in FIG. 15. Subsequently, at Step 73, the wire frame of the first address (i=1) amongst these children wire frames is appointed as the parent of the next level (J+1), i.e., as the next candidate edge line, and the process is returned to Step 63 to execute the loop retrieval. In example shown in FIG. 18, the wire frame $l_{11}$ is the wire frame constituting the candidate edge line at the level (J+1). In the case of the inner loop retrieval, the operation at Step 70 is not necessary because, as explained before, the inner loop retrieval does not necessitate the division of the wire frame group.

The Steps explained above are followed until a loop is formed or, if not, until the retrieval is finished with all of the wire frames.

In case of the process shown in FIG. 18A, a loop is formed as an outer loop, as a result of the repetition of the above-described Steps, when the wire frame $l_{ST}$ is selected as the candidate edge line of the first level.

FIGS. 19A to 28B illustrate the process which is conducted after the appointment of the wire frame $l_{ST}$. In these Figures which show successive steps of the process, the wire frames which have become candidate edge lines are shown by solid lines, whereas the wire frames which have just become children at respective moments are indicated by broken lines. These wire frames are drawn in a manner overlapping the original two-dimensional wire frames. The Figures with suffix B correspond to the Figure of the same number with suffix A, and illustrate the tree structures corresponding to the loop retrieval steps shown in corresponding Figure having the suffix A. Black circles appearing in respective Figures show that the wire frames marked by the black circles are neither crossed by nor connected to any other wire frame so that the formation of the tree structure is not conducted with this wire frame. Thus, in Figures having suffix B, the solid lines show a side line which connect the groups of candidate edge lines up to the instant moment, whereas the broken lines show other side lines representing the relationship between parents and children formed up to the instant moment.

Figure 29A:
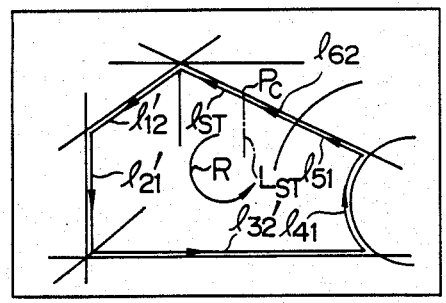
FIGS. 29A and 29B are illustrations of conditions for the judgement as to whether the loop structure is for the outer loop retrieval.
Figure 29B:
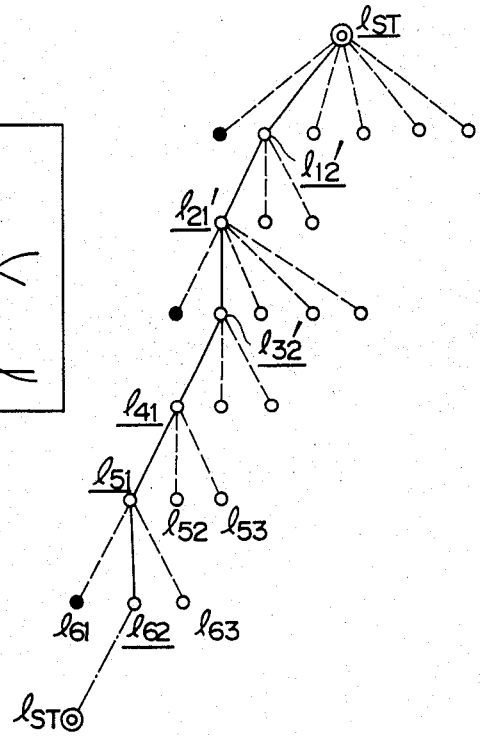

The judgement as to whether a loop has been formed or not is conducted as follows. As explained before, different conditions apply for the judgement of formation of the outer loop and the inner loop. More specifically, as shown in FIGS. 29A and 29B, the judgement of formation of an outer loop is given only when the terminal end of the wire frame constituting the parent at a certain level of the tree structure, i.e., a candidate edge line, has coincided with the terminal point $P_c$ of the loop retrieval starting line, i.e., the starting point of the candidate edge line $l_{ST}$ of the first level. The edge lines constituting the thus formed loop are the wire frames which have experienced the parent in the tree structures of respective steps of the loop retrieval until the loop is formed. For instance, in the step shown in FIG. 29A, seven underlined lines $l_{ST}$, $l'_{12}$ $l'_{2}{}^{1'}$ $l'_{32}$ , $l_{51}$ and $l_{62}$ are the edge lines as constituents of the loop. The outer loop thus obtained revolves in the direction of arrow R in FIG. 29A without exemption.

Figure 30A:
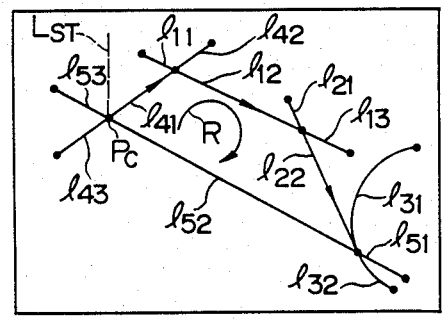
Figure 30B:
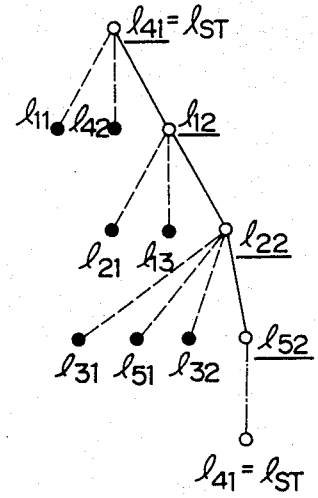

The formation of an inner loop is judged on either one of the following two conditions. One of these conditions is that the same as that for the judgement of the formation of the outer loop, i.e., the fact that the terminal end of a wire frame constituting the parent in a certain level of the tree structure, i.e., a candidate edge line, has coincided with the terminal point of the loop retrieval starting line $l_{ST}$, as shown in FIGS. 30A and 30B. It will be seen that, in the step shown in FIG. 30A, the terminal point of the wire frame $l_{52}$ constituting the parent of the fourth level in the tree structure coincides with the terminal point $P_c$ of the starting line $l_{ST}$. Thus, the loop is formed of edge lines which are the four underlined lines $l_{41}$ ($l_{ST}$), $l_{12}$, $l_{22}$ and $l_{52}$. The thus formed loop revolves, without exemption, in the clockwise direction R in FIG. 30A.

Another condition for judging the formation of an inner loop is that, as shown in FIGS. 31A and 31B, the terminal point of the wire frame of a certain level in the tree structure has coincided with the terminal point of any constituent wire frame amongst the wire frames which have experienced children in the tree structure formed up to the instant moment. In this case, as will be seen from FIG. 31A, the last edge line $l_2$ constituting the loop has been already presented as a child in the tree structure of the level 2. Since the direction of this edge line $l_2$ is counter to the direction R of rotation of the loop, it is necessary to reverse the direction of this edge line so as to form an edge line $l'_2$ which is directed from the terminal point to the starting point. Thus, the inner loop is constituted by edge lines which include the wire frames which have experienced the parents of respective levels of the tree structure from the level of the reversed last edge line $l'_2$ (level 1 in FIG. 39B) down to the level at which the loop is completed, and the last edge line $l'_2$. Thus, in the step shown in FIG. 31B, the edge lines constituting the loop are the five underlined lines $l_{12}$, $l_{13}$, $l_{82}$, $l_{10}$ and $l'_2$. The thus obtained inner loop revolves clockwise as indicated by an arrow R in FIGS. 31A without exemption.

It is thus possible to extract the edge lines as constituents of loops which are to become an outer loop and an inner loop.

According to the described embodiment, the thus extracted edge lines are subjected to a post-processing which is broadly sorted into two kinds of processing. These processings are required due to the fact that the described embodiment is intended for use as an interactive modeling system which constitutes a base for a system such as CAE, CAD and CAM systems.

Figure 32A:
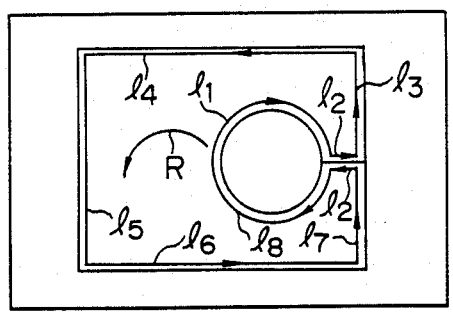
FIGS. 32A, 32B, 33A, 33B, 34A and 34B are illustrations of a process for the separation and synthesis of edge lines obtained through a loop retrieval.
Figure 32B:
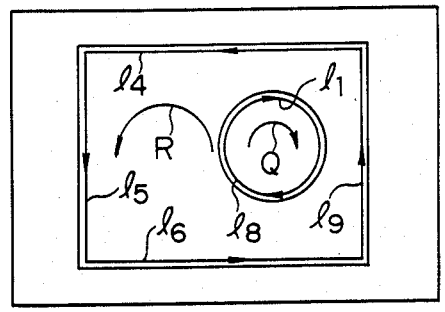

The first one of these two kinds of processing is effected when the group of the edge lines constituting an outer loop includes the same edge line, i.e., when the loop passes one of the edge lines twice, or when two or more edge lines are concentrated to a common branching point. In such a case, the groups of the edge lines are divided into a group which constitutes the outer loop and a group which constitutes the inner loop, by erasing the edge lines which is passed twice or the branching point to which two or more edge lines are concentrated. FIGS. 32A and 32B illustrate an example in which the edge line which is passed twice is erased. Referring to FIG. 32A, the outer loop revolving in the direction R is originally constituted by nine edge lines $l_1$, $l_2$, $l_3$, $l_4$, $l_5$, $l_6$, $l_7$, $l_2$ and $l_8$. Thus, the loop passes the edge line $l_2$ two times. Therefore, the line $l_2$ is erased and the edge lines $l_3$ and $l_7$ are combined into a single edge line $l_9$, whereby the edge lines are grouped into four edge lines $l_9$, $l_4$, $l_5$ and $l_6$ constituting an outer loop revolving in the direction R and two edge lines $l_1$ and $l_2$ constituting an inner loop which revolves in a direction indicated by an arrow Q.

Figure 33A:
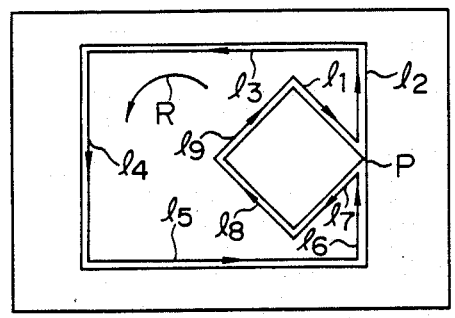
Figure 33B:
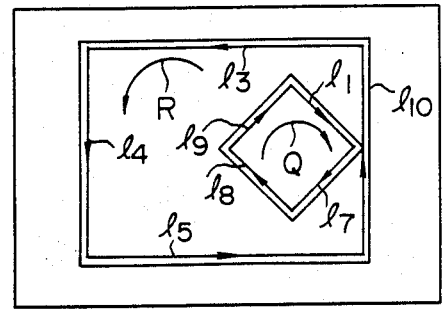

Referring now to FIG. 33A, an outer loop is constituted by edge lines $l_1$ to $l_9$, and four edge lines $l_1$, $l_2$, $l_6$ and $l_7$ amongst these edge lines are concentrated to a branching point P. In this case, therefore, the edge lines are grouped into an outer loop having the revolving direction R and constituted by four edge lines $l_3$, $l_4$, $l_5$ and $l_{10}$ which is formed by combining the edge lines $l_6$ and $l_2$, and an inner loop having the revolving direction Q and constituted by four edge lines $l_1$, $l_7$, $l_8$ and $l_9$.

Figure 34A:
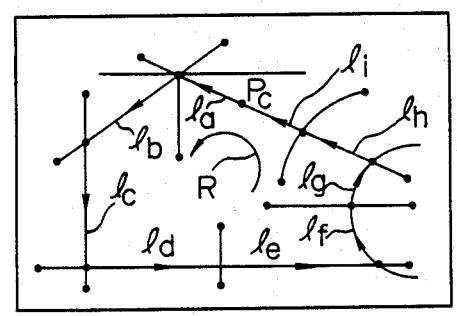
Figure 34B:
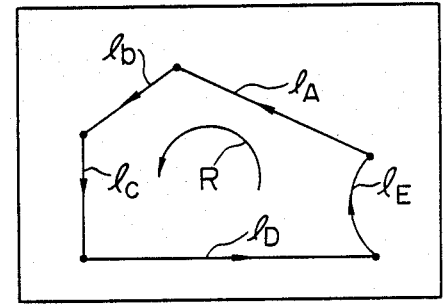

Another post-processing is carried out both for the outer and inner loops. This processing is intended for modifying the loops obtained through the loop retrieval in such a manner as to minimize the number of the edge lines. More specifically, in this processing, edge lines which can be geometrically combined are reformed into a single edge line. Assume here that an outer loop revolving in the counterclockwise direction R is constituted by nine edge lines $l_a$, $l_b$, $l_c$, $l_d$, $l_e$, $l_f$, $l_g$, $l_h$ and $l_i$, as shown in FIG. 34A. It will be seen that the edge lines $l_i$, $l_i$ and $l_h$ are geometrically assembled into a single line $l_A$. Similarly, the edge lines $l_d$ and $l_e$ can be assembled together into a single line $l_D$, while the edge lines $l_f$ and $l_g$ can be assembled together into a single line $l_E$. Through this geometrical trimming operation, the outer loop shown in FIG. 34A can be formed from five edge lines $l_A$, $l_b$, $l_c$, $l_D$ and $l_E$ which revolve in the direction of arrow as shown in FIG. 34B, whereby the number of edge lines is reduced to five.

An explanation will be made hereinunder, with specific reference to FIG. 35, as to the basic data used in the loop retrieval, as well as the information structures thereof. The dots appearing in this Figure represent the pointers to the storage position indicated by arrows.

A reference numeral 81 designates a two-dimensional wire-frame table having wire-frame storage portion which stores information H inherent in each wire frame and geometrical information data G. An edge-line table 82 stores data such as the pointers to a coordinate value table 88 which stores the coordinate values X, Y of the starting and terminal points in the actual space, position pointers to the wire frame table 81 storing the geometrical information, parametric values $a_1$ and $a_2$ of the starting and terminating points, and so forth.

A reference numeral 83 designates a parent edge-line table which stores starting and terminating pointers to a child edge-line table, in accordance with the levels of the parents.

The child edge-line table 84 stores in a given order the position pointers to the edge-line table 82, in relation to the starting and terminating pointers in the parent edge-line table 83.

A loop table 85 stores pointers to the edge-line table, with representation of positive or negative direction, in relation to outer-loop starting and terminating pointers in a definite surface table 86 and inner-loop starting and terminating pointers in an inner loop table 87.

The definite surface table 86 stores starting and terminating pointers to the loop table 85, as well as the starting and terminating pointers to the inner loop table 87 representing the groups of inner loops.

The inner loop table 87 stores the starting and terminating pointers to the loop table 85 representing the inner loop.

The process for forming a definite surface on the basis of given two-dimensional wire frames has been described from the view point of the data structures.

As will be understood from the foregoing description, according to the invention, it is possible to automatically pick-up, in compliance with the user's demand, an outer loop constituting the minimal region containing a group of inner loops therein, simply by input of a single point on a two-dimensional wire frame pattern or input of a single specific pattern, even when the two-dimensional wire frame pattern is constituted by two-dimensional wire frames which are taken out from a data base in the state as they are after formation thereof as drafting data.

The user can appoint, on the two-dimensional wire frame pattern shown on a graphic display, any desired point in a definite surface which is to be formed into a three-dimensional form or, alternatively, a specific pattern. This input operation can be conducted in good concert with the user's recognition of the three-dimensional form on the design drawings, so that a high efficiency of the interactive modeling system is ensured.

Furthermore, in the described invention, the geometrical processing including the loop retrieval in a group of two-dimensional wire frames can be conducted by the use of information structures such as tree structures which the computer can handle with the highest efficiency. Consequently, the described embodiment offers a high performance by virtue of increased processing speed and minimization of the data storage region thanks to dynamical allocation.

As has been described, according to the invention, it is possible to automatically pick-up a definite surface or a group of wire frames, simply by appointing a point within a region or appointing a specific pattern with automatically formed surface, on a two-dimensional wire frame pattern which represents the surfaces constituting a three-dimensional form, so that the number of commands which are to be input during the interactive processing can be reduced remarkably. Furthermore, the work for directly appointing the definite surface which represents the actual form can be done in good concert with the process for the recognition of the objective form by the user from the design drawings, which remarkably improves the performance of the man-machine interface in the interactive processing for the purpose of generating a three-dimensional form.

As has been described, the invention provides a geometric modeling system which is easy to operate, by virtue of the improvement in the performance of the man-machine interface, as well as the simplification of the input operation.

What is claimed is:

1. A geometric modeling system of an interactive type including an input means, a data base for storing data of two-dimensional wire frame patterns representing surfaces constituting a two or a three-dimensional form, said data being inputted to said data base through said input means, a display means upon which said two-dimensional wire frame patterns retrieved form said data base are displayed, and an operation unit for generating two-dimensional pattern data in said data base in response to input by said input means of specific positions or a specific pattern of a two-dimensional wire frame pattern displayed on said display means, wherein the improvement comprises:
   said display means for displaying said two-dimensional wire frame patterns representing boundaries of surfaces constituting said three-dimensional form; and
   said operation unit for generating, upon receipt of information from said input means related to a position of an internal point within a surface represented by said two-dimensional wire frame patterns, data related to a definite surface as the object of the generation of the two-dimensional pattern, which constitutes a loop corresponding to a boundary of said definite surface having a minimum area said loop being one of a plurality of loops corresponding to the boundaries of said definite surface including said internal point when data related to said internal point is appointed by said input means thereby, generating data related to said two-dimensional pattern in said data base.

2. A geometric modeling system according to claim 1, wherein, said loop is formed by determining an orientation of said loop relative to an oriented line which is oriented by the position of said internal point and a position of a candidate loop line, and in accordance with the state of local intersection between said oriented line and said candidate loop line.

3. A geometric modeling system according to claim 1, wherein, said loop is formed by determining successive candidate edge lines by examining the state of intersection between an oriented candidate edge line and a next group of edge lines to be retrieved.

4. A geometric modeling system according to claim 1, wherein said definite surface as the object of generation or boundaries of said definite surface are determined as boundary data which include an outer loop constituting a minimum region including an appointed point which is appointed through input of data related to said internal point within said surface represented by said two-dimensional wire frame patterns, and a group of inner loops having no other inner loop external thereof.

5. A geometric modeling system according to claim 4, wherein, said outer loop is formed by determining an orientation of said outer loop retrieval in accordance with the states of local intersection between a line starting from the appointed point and terminating at any point on a candidate outer loop line.

6. A geometric modeling system according to claim 5, wherein, an inner loop is formed by determining an inner loop starting line and its orientation in accordance with the states of local intersection between an oriented line starting from a desired point external of said inner loop to be formed and terminating at a desired point on a candidate inner loop line and said candidate inner loop line.

7. A geometric modeling system according to claim 4, wherein, said outer loop and an inner loop are formed by determining successive candidate edge lines by examining the state of intersection between an oriented candidate edge line and a next group of edge lines to be retrieved.

8. A geometric modeling system according to claim 1, wherein the formation of said loop is conducted, in a process for generating boundary data of said surface from said two-dimensional wire frame pattern, by generation of tree structures composed of candidate edge lines and retrieval of edge lines in said tree structures.

9. A geometric modeling system of an interactive type including an input means, a data base for storing data of two-dimensional wire frame patterns representing surfaces constituting a three-dimensional form, said data being inputted to said data base by said input means, a display means upon which said two-dimensional wire frame patterns retrieved from said data base is displayed, and an operation unit for generating two-dimensional pattern data in said data base in response to input of specific positions or a specific pattern of a two-dimensional wire frame pattern displayed on said display means by said input means, wherein the improvement comprises:

said display means for displaying said two-dimensional wire frame pattern representing boundaries of surfaces constituting said three-dimensional form, said operation units for generating, upon receipt of information related to a position of an internal point within a surface represented by said two-dimensional wire patterns input by said input means, data related to boundaries of a definite surface as the object of the generation of the two-dimensional pattern which constitutes a loop corresponding to a boundary of said definite surface having a minimum area said loop being one of a plurality of loops corresponding to the boundaries of said definite surface including said internal point, when data related to said internal point is appointed, and said operation unit further performs a three-dimensional process using said data related to said definite surface or boundaries, so as to generate data related to said three-dimensional form in said data base.

10. A geometric modeling system according to claim 9, wherein, said loop is formed by determining an orientation of said loop in accordance with a line which is determined by the position of said appointed point and a position of a candidate loop line, and in accordance with the state of local intersection between said line and said candidate loop line.

11. A geometric modeling system according to claim 9, wherein, said outer loop is formed by determining successive candidate edge lines by examining the state of intersection between an oriented candidate edge line and a next group of edge lines to be retrieved.

12. A geometric modeling system according to claim 9, wherein said definite surface as the object of generation of said two dimensional pattern or the boundaries of said definite surface are determined, as boundary data which include an outer loop constituting a minimum region including said appointed point and a group of inner loops inside said outer loop and having no other external loop thereof.

13. A geometric modeling system according to claim 12, wherein, an outer loop is formed by determining an orientation of said outer loop in accordance with the states of local intersection between a line starting from said appointed point and terminating at any point on a candidate outer loop line.

14. A geometric modeling system according to claim 12, wherein said outer loop is formed by determining successive candidate edge lines by examining the state of intersection between an oriented candidate edge line and a next group of edge line to be retrieved.

15. A geometric modeling system according to claim 13 or 14 wherein said inner loop is formed by determining an inner loop starting line and its orientation in accordance with the states of local intersection between an oriented line starting from any desired point external of said inner loop to be formed and terminating at an desired point on a candidate inner loop line.

16. A geometric modeling system according to claim 9, wherein said definite surface as the object of generation or the boundaries of said definite surface are determined, in responsive to appointment of data related to a surface represented by said two-dimensional wire frame pattern, as boundary data which include an outer loop constituting a minimum region and a group of inner loops inside said outer loop and having no external loop thereof.

17. A geometric modeling system of an interactive type including an input means, a data base for storing data related to a two-dimensional wire frame pattern representing surfaces constituting a three-dimensional form, said data being inputted to said data base by said input means, a display means upon which said two-dimensional wire frame patterns retrieved from said data base is displayed, and an operation unit for generating two-dimensional wire frame pattern data in said data base in response to input of specific position or specific patters displayed on said display means input by said input means, wherein the improvement comprises:

said display means for displaying two-dimensional wire frame patterns representing boundaries of surfaces constituting said three-dimensional form, said operation unit for generating, upon receipt of information related to a position of an internal point, data related to boundaries of a definite surface, which constitutes a loop corresponding to a boundary of said definite surface having a minimum area, said loop being one of a plurality of loops corresponding to the boundaries of said definite surface including said internal point and said operation unit further performs a sweeping process of said definite surface so as to generate data related to said three-dimensional form in said data base.

18. In a geometric modeling method of an interactive type, including the steps of storing data concerning two-dimensional wire frame patterns representing surfaces constituting a three-dimensional form, in a data base by an input means, displaying said two-dimensional wire frame patterns retrieved from said data base, on a display means, and generating two-dimensional data in said data base by means of an operation unit in response to an input of specific positions or a specific pattern of an two-dimensional wire frame pattern displayed on said display means by said input means, the improvement comprising:

displaying said two-dimensional wire frame patterns representing said surfaces constituting said three-dimensional form;

appointing a point within a surface represented by said two-dimensional wire frame pattern by said input means so as to allow said operation unit to draw a candidate start line from said appointed point as a starting point to one of said boundaries;

forming a tree structure composed of candidate start lines regarded as a parent of a first level and line segments about connecting or crossing points between said candidate start lines and said boundaries, regarded as children of a second level;

retrieving for each of said children of said second level whether they have their own children or not;

withdrawing those of said children which have none of their own children for the next level candidate start lines as parents of tree structures each having children of a third level in the form of line segments about crossing or connecting points between the associated one of said children of the second level and lines crossing thereof or connected thereto; retrieving for each of said children of said third level whether they have their own children or not;

withdrawing those of said children of said third level which have none of their own children from the next candidate start lines as parents of tree structures having children of a fourth level; and
repeating the above steps so as to form candidate start lines and tree-structures of successive levels, successively so as to retrieve whether said starting candidate lines as parents have children or not until it is found that some of said successive starting candidate lines form a loop or that all successive candidate start lines do not form a loop.

* * * * *